US012475903B2

(12) United States Patent
Nagel et al.

(10) Patent No.: US 12,475,903 B2
(45) Date of Patent: *Nov. 18, 2025

(54) AUDIO ENCODER AND BANDWIDTH EXTENSION DECODER

(71) Applicant: Fraunhofer-Gesellschaft zur Foerderung der angewandten Forschung e.V., Munich (DE)

(72) Inventors: Frederik Nagel, Nuremberg (DE); Sascha Disch, Fuerth (DE); Guillaume Fuchs, Erlangen (DE); Juergen Herre, Buckenhof (DE); Christian Griebel, Nuremberg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,964

(22) Filed: Jul. 14, 2023

(65) Prior Publication Data

US 2023/0377590 A1 Nov. 23, 2023

Related U.S. Application Data

(63) Continuation of application No. 17/965,830, filed on Oct. 14, 2022, now Pat. No. 11,705,146, which is a (Continued)

(51) Int. Cl.
*G10L 21/038* (2013.01)
*G10L 19/00* (2013.01)

(Continued)

(52) U.S. Cl.
CPC ............ *G10L 19/265* (2013.01); *G10L 19/00* (2013.01); *G10L 21/038* (2013.01); *G10L 19/24* (2013.01)

(58) Field of Classification Search
CPC ..... G10L 19/265; G10L 19/00; G10L 21/038; G10L 19/24; G10L 21/1815; G10L 15/22;

(Continued)

(56) References Cited

U.S. PATENT DOCUMENTS 5,657,422 A 8/1997 Janiszewski et al.
6,549,884 B1 * 4/2003 Laroche ................ G10L 21/003 704/229

(Continued)

FOREIGN PATENT DOCUMENTS

CN 101364854 B 1/2011
EP 0424016 A2 4/1991

(Continued)

OTHER PUBLICATIONS

Nagel et al., "Audio Encoder and Bandwidth Extension Decoder", U.S. Appl. No. 17/965,830, filed Oct. 14, 2022.

(Continued)

*Primary Examiner* — Vijay B Chawan
(74) *Attorney, Agent, or Firm* — Keating & Bennett, LLP

(57) ABSTRACT

An audio encoder for providing an output signal using an input audio signal includes a patch generator, a comparator and an output interface. The patch generator generates at least one bandwidth extension high-frequency signal, wherein a bandwidth extension high-frequency signal includes a high-frequency band. The high-frequency band of the bandwidth extension high-frequency signal is based on a low frequency band of the input audio signal. A comparator calculates a plurality of comparison parameters. A comparison parameter is calculated based on a comparison of the input audio signal and a generated bandwidth extension high-frequency signal. Each comparison parameter of the plurality of comparison parameters is calculated based on a different offset frequency between the input audio signal and (Continued)

a generated bandwidth extension high-frequency signal. Further, the comparator determines a comparison parameter from the plurality of comparison parameters, wherein the determined comparison parameter fulfils a predefined criterion.

18 Claims, 19 Drawing Sheets

Related U.S. Application Data continuation of application No. 17/159,331, filed on Jan. 27, 2021, now Pat. No. 11,594,237, which is a continuation of application No. 16/260,487, filed on Jan. 29, 2019, now Pat. No. 10,937,437, which is a continuation of application No. 14/709,804, filed on May 12, 2015, now Pat. No. 10,229,696, which is a continuation of application No. 13/691,950, filed on Dec. 3, 2012, now Pat. No. 9,058,802, which is a continuation of application No. 13/158,547, filed on Jun. 13, 2011, now Pat. No. 8,401,862, which is a continuation of application No. PCT/EP2009/066980, filed on Dec. 11, 2009.

(60) Provisional application No. 61/122,552, filed on Dec. 15, 2008.

(51) Int. Cl.
*G10L 19/26* (2013.01)
*G10L 19/24* (2013.01)

(58) Field of Classification Search
CPC ... G10L 15/26; G10L 15/02; G10L 2015/033; G10L 21/06; G10L 15/18
See application file for complete search history.

(56) References Cited

U.S. PATENT DOCUMENTS 7,873,064 B1 1/2011 Li et al.
8,401,862 B2* 3/2013 Nagel .................. G10L 19/265 704/201
8,438,015 B2* 5/2013 Schnell .................. G10L 25/45 704/211
8,560,329 B2 10/2013 Qi et al.
9,058,802 B2* 6/2015 Nagel .................. G10L 21/038
9,280,982 B1 3/2016 Kushner
9,805,736 B2* 10/2017 Liu .................. G10L 19/265
10,229,696 B2* 3/2019 Nagel .................. G10L 19/265
10,249,313 B2* 4/2019 Gao .................. G10L 19/22
10,373,629 B2* 8/2019 Liu .................. G10L 21/0388
10,937,437 B2* 3/2021 Nagel .................. G10L 19/265
11,594,237 B2* 2/2023 Nagel .................. G10L 19/265
11,705,146 B2* 7/2023 Nagel .................. G10L 19/00 704/500
2003/0158726 A1* 8/2003 Philippe .................. G10L 21/038 704/203
2004/0078205 A1* 4/2004 Liljeryd .................. H04B 1/667 704/503
2004/0125878 A1* 7/2004 Liljeryd .................. H04B 1/667 375/242
2005/0096917 A1* 5/2005 Kjorling .................. G10L 19/093 704/E21.011
2006/0190245 A1* 8/2006 Iser .................. G10L 21/038 704/219
2006/0271373 A1 11/2006 Khalil et al.
2007/0174063 A1* 7/2007 Mehrotra .................. G10L 21/038 704/E21.011
2007/0206645 A1 9/2007 Sundqvist et al.
2007/0239462 A1 10/2007 Makinen et al.
2007/0285815 A1* 12/2007 Herre .................. H04H 20/89 360/13
2008/0049795 A1 2/2008 Lakaniemi
2008/0147414 A1 6/2008 Son et al.
2008/0294429 A1 11/2008 Su et al.
2009/0326930 A1 12/2009 Kawashima et al.
2010/0049511 A1 2/2010 Ma et al.
2010/0085102 A1* 4/2010 Lee .................. G10L 19/008 327/334
2010/0114583 A1* 5/2010 Lee .................. G10L 21/038 704/500
2011/0004479 A1* 1/2011 Ekstrand .................. G10L 19/0212 704/500
2011/0112670 A1* 5/2011 Disch .................. G10L 21/04 700/94
2011/0125505 A1 5/2011 Vaillancourt et al.
2011/0196673 A1 8/2011 Sharma et al.
2011/0231195 A1* 9/2011 Nongpiur .................. G10L 21/038 704/E21.001
2012/0136670 A1* 5/2012 Ishikawa .................. G10L 21/038 704/500
2012/0195442 A1* 8/2012 Villemoes .................. C12Q 1/6883 381/98
2012/0209604 A1 8/2012 Sehlstedt
2012/0271644 A1 10/2012 Bessette et al.
2013/0144632 A1 6/2013 Sung
2013/0332177 A1 12/2013 Helmrich et al.
2014/0188465 A1 7/2014 Choo et al.
2015/0073784 A1* 3/2015 Gao .................. G10L 21/038 704/223
2015/0235653 A1* 8/2015 Liu .................. G10L 19/265 704/500
2017/0221498 A1* 8/2017 Gao .................. G10L 19/0204
2018/0018989 A1* 1/2018 Liu .................. G10L 21/0388
2019/0355378 A1* 11/2019 Liu .................. G10L 19/265

FOREIGN PATENT DOCUMENTS

EP 0985328 B1 3/2006
EP 1850327 A1 10/2007
EP 1088302 B1 7/2008
EP 2107556 A1 10/2009
FR 2830970 A1 4/2003
WO 9847313 A2 10/1998
WO 2011042464 A1 4/2011
WO 2011048094 A1 4/2011
WO 2012110415 A1 8/2012
WO 2012110448 A1 8/2012
WO 2014096279 A1 6/2014

OTHER PUBLICATIONS

Schnell et al., "Low Delay Filterbanks for Enhanced Low Delay Audio Coding", 2007 IEEE Workshop on Applications of Signal Processing to Audio and Acoustics, Oct. 21-24, 2007, pp. 235-238.
Malvar, "Signal Processing with Lapped Transforms", Chapter 5, Computer Science Engineering, 1992, 378 pages.
Bosi al., "Introduction To Digital Audio Coding And Standards", Springer Science+Business Media, LLC, 2003, 442 pages.
Wikipedia, "Convolution theorem", retrieived Feb. 12, 2025, pp. 1-7.
Clark et al., "A Unified Approach to Time- and Frequency-Domain Realization of FIR Adaptive Digital Filters", IEEE Transactions on Acoustics, Speech, and Signal Processing, vol. ASSP-31, No. 5, Oct. 1983, pp. 1073-1083.
International Telecommunication Union, Series G: Transmission Systems and Media, Digital Systems and Networks Digital terminal equipments—Coding of analogue signals by methods other than PCM, Wideband coding of speech at around 16 kbit/s using Adaptive Multi-Rate Wideband (AMR-WB), ITU-T G.722.2, Jul. 2003, 72 pages.
International Telecommunication Union, Series G: Transmission Systems and Media, Digital Systems and Networks Digital terminal equipements—Coding of analogue signals by methods other than

(56) References Cited

OTHER PUBLICATIONS

PCM, Wideband coding of speech at around 16 kbit/s using Adaptive Multi-Rate Wideband (AMR-WB), ITU-T G.722.2—Annex A, Jan. 2002, 16 pages.

Kondoz, "Digital Speech: Coding for Low Bit Rate Communication Systems", John Wiley & Sons, 2004, 446 pages.

Lecomte et al., "An Improved Low Complexity AMR-WB+ Encoder using Neural Networks for Mode Selection", Audio Engineering Society (AES), 123rd Audio Engineering Society Convention, Convention Paper 7294, section 2.1.2, Oct. 5-8, 2007, 11 pages.

International Telecommunication Union, "General Aspects of Digital Transmission Systems, Dual Rate Speech Coder for Multimedia Communications Transmitting At 5.3 AND 6.3 kbit/s", ITU-T G.723.1, 31 pages.

Ravishankar, "Speech Coding", Lawrence Livermore National Laboratory, UCRL-ID-130167, https://doi.org/10.2172/325392, May 8, 1998, 144 pages.

Hou et al., "Real-time Audio Error Concealment Method Based on Sinusoidal Model", International Conference on audio Language and Image Processing, IEEE, Aug. 2008, 8 pages.

International Telecommunication Union, "Series G: Transmission Systems and Media, Digital Systems and Networks Digital terminal equipments—Coding of voice and audio signals, Frame error robust narrow-band and wideband embedded variable bit-rate coding of speech and audio from 8-32 kbit/s", ITU-T G.718, Jun. 2008, 257 pages.

Warren et al., "Analysis of the spectral envelope of sounds by the human brain", NeuroImage vol. 24 Issue 4, https://pubmed.ncbi.nlm.nih.gov/15670682/#:~:text=Spectral%20envelope%20is%20the%20shape,of%20sounds%20such%20as%20vowels, Feb. 15, 2005, pp. 1052-1057.

Virette, "Low Delay Transform for High Quality Low Delay Audio Coding", Signal and Image processing, Université de Rennes, Jan. 2012, 197 pages.

Ostergaard et al., "Real-time Perceptual Moving-Horizon Multiple-Description Audio Coding", IEEE Transactions On Signal Processing 59(9), 2011, 14 pages.

Oh et al., "A Fast Quantization Loop Algorithm for MP3/AAC Encoders", The Proceedings of the AES 29th International Conference, Sep. 2-4, 2006, 5 pages.

Fraunhofer IIS, "Qualification Deliverables for the Fraunhofer IIS Candidate for EVS (including Technical Description and Report on Compliance to Design Constraints", TSG SA4#72bis meeting, Tdoc S4-130345, Mar. 11-15, 2013, pp. 1-8.

"3rd Generation Partnership Project; Technical Specification Group Service and System Aspects; Audio codec processing functions; Extended AMR Wideband codec; Transcoding fuinctions (Release 6)", 3GPP TS 26.290 V2.0.0, Sep. 2004, pp. 1-85.

"3rd Generation Partnership Project; Technical Specification Group Service and System Aspects; Audio codec processing functions; Extended Adaptive Multi-Rate—Wideband (AMR-WB+) codec; Transcoding fuinctions (Release 10)", 3GPP TS 26.290 V10.0.0, Mar. 2011, pp. 1-85.

"Universal Mobile Telecommunications System (UMTS); Audio codec processing functions; Extended Adaptive Multi-Rate—Wideband (AMR-WB+) codec; Transcoding functions (3GPP TS 26.290 version 6.1.0, Release 6)", ETSI TS 126 290 V6.1.0, Dec. 2004, 87 pages.

"3rd Generation Partnership Project; Technical Specification Group Services and System Aspects; General audio codec audio processing functions; Enhanced aacPlus general audio codec; Encoder specification AAC part (Release 6)", 3GPP TS 26.403 V6.0.0, Sep. 2004, pp. 1-23.

"3rd Generation Partnership Project; Technical Specification Group Services and System Aspects; Codec for Enhanced Voice Services (EVS); ANSI C code (fixed-point) (Release 14)", 3GPP TS 26.442 V14.0.0, Mar. 2017, pp. 1-10.

"3rd Generation Partnership Project; Technical Specification Group Services and System Aspects; Codec for Enhanced Voice Services (EVS); ANSI C code (floating-point) (Release 14)", 3GPP TS 26.443 14.0.0, Mar. 2017, pp. 1-10.

"3rd Generation Partnership Project; Technical Specification Group Services and System Aspects; Codec for Enhanced Voice Services (EVS); Detailed Algorithmic Description (Release 12)", 3GPP TS 26.445 V12.0.0, Sep. 2014, 640 pages.

"3rd Generation Partnership Project; Technical Specification Group Services and System Aspects; Codec for Enhanced Voice Services (EVS); Detailed Algorithmic Description (Release 14)", 3GPP TS 26.445 V14.0.0, Mar. 2017, 674 pages.

"3rd Generation Partnership Project; Technical Specification Group Services and System Aspects; Codec for Enhanced Voice Services (EVS); Detailed Algorithmic Description (Release 14)", 3GPP TS 26.445 V14.2.0, Dec. 2017, 675 pages.

"3rd Generation Partnership Project; Technical Specification Group Services and System Aspects; Codec for Enhanced Voice Services (EVS); Detailed Algorithmic Description (Release 16)",3GPP TS 26.445 V16.2.0, Dec. 2021, 676 pages.

"3rd Generation Partnership Project; Technical Specification Group Services and System Aspects; Codec for Enhanced Voice Services (EVS); Detailed Algorithmic Description (Release 17)", 3GPP TS 26.445 V17.0.0, Apr. 2022, pp. 1-24.

"3rd Generation Partnership Project; Technical Specification Group Services and System Aspects; Codec for Enhanced Voice Services (EVS); Error Concealment of Lost Packets (Release 14)", 3GPP TS 26.447 V14.0.0, Mar. 2017, 82 pages.

"3rd Generation Partnership Project; Technical Specification Group Services and System Aspects; Codec for Enhanced Voice Services (EVS); Error Concealment of Lost Packets (Release 14)", 3GPP TS 26.447 V14.2.0, Jun. 2020, 83 pages.

"3rd Generation Partnership Project; Technical Specification Group Services and System Aspects; Codec for Enhanced Voice Services (EVS); Error Concealment of Lost Packets (Release 16)", 3GPP TS 26.447 V16.0.0, Mar. 2019, 82 pages.

"3rd Generation Partnership Project; Technical Specification Group Services and System Aspects; Codec for Enhanced Voice Services (EVS); Performance Characterization (Release 17)", 3GPP TR 26.952 V17.0.0, Apr. 2022, 176 pages.

Fuchs et al, "MDCT-Based Coder for Highly Adaptive Speech and Audio Coding", 17th European Signal Processing Conference (EUSIPCO 2009), Aug. 24-28, 2009, 5 pages.

Schnell et al., "Proposed Core Experiment on AAC-ELD", International Organisation for Standardisation, ISO/IEC JTC1/SC29/WG11, Apr. 18, 2007, 17 pages.

* cited by examiner

AUDIO ENCODER AND BANDWIDTH EXTENSION DECODER

CROSS-REFERENCE TO RELATED APPLICATIONS

This application is a continuation of copending U.S. patent application Ser. No. 17/965,830, filed Oct. 14, 2022, which in turn is a continuation of copending U.S. patent application Ser. No. 17/159,331, filed Jan. 27, 2021, which in turn is a continuation of copending U.S. patent application Ser. No. 16/260,487, filed Jan. 29, 2019, which in turn is a continuation of copending U.S. patent application Ser. No. 14/709,804, filed May 12, 2015, which in turn is a continuation of copending U.S. patent application Ser. No. 13/691,950, filed Dec. 3, 2012, which in turn is a continuation of U.S. patent application Ser. No. 13/158,547, filed Jun. 13, 2011, which in turn is a continuation of copending International Application No. PCT/EP2009/066980, filed Dec. 11, 2009, which are all incorporated herein by reference in their entirety, and additionally claims priority from U.S. Application No. 61/122,552, filed Dec. 15, 2008, which is incorporated herein by reference in its entirety.

Embodiments according to the invention relate to the audio signal processing and, in particular, an audio encoder, a method for providing an output signal, a bandwidth extension decoder and a method for providing a bandwidth extended audio signal.

BACKGROUND OF THE INVENTION

The hearing adapted encoding of audio signals for data reduction for an efficient storage and transmission of these signals has gained acceptance in many fields. Encoding algorithms are known, for instance, as MPEG 1/2 LAYER 3 "MP3" or MPEG 4 AAC. The coding algorithm used for this, in particular when achieving lowest bit rates, leads to the reduction of the audio quality which is often mainly caused by an encoder side limitation of the audio signal bandwidth to be transmitted. A low-pass filtered signal is coded using a so-called core coder and the region with higher frequencies is parameterized so that they can approximately be reconstructed from the low-pass filtered signal.

It is known from WO 98 57436 to subject the audio signal to a band limiting in such a situation on the encoder side and to encode only a lower band of the audio signal by means of a high quality audio encoder. The upper band, however, is only very coarsely characterized, i.e. by a set of parameters which allow the reproduction of the original spectral envelope of the upper band. On the decoder side, the upper band is then synthesized. For this purpose, a harmonic transposition is proposed, wherein the lower band of the decoded audio signal is supplied to a filterbank. Filterbank channels of the lower band are connected to filterbank channels of the upper band, or are "patched", and each patched bandpass signal is subjected to an envelope adjustment. The synthesis filterbank belonging to a special analysis filterbank here receives bandpass signals of the audio signal in the lower band and envelope-adjusted bandpass signals of the lower band which were harmonically patched into the upper band. The output signal of the synthesis filterbank is an audio signal extended with regard to its audio bandwidth which was transmitted from the encoder side to the decoder side with a very low data rate. In particular, filterbank calculations and patching in the filterbank domain may become a high computational effort.

Complexity-reduced methods for a bandwidth extension of band-limited audio signals instead use a copying function of low-frequency signal portions (LF) into the high-frequency range (HF), in order to approximate information missing due to the band limitation. Such methods are described in M. Dietz, L. Liljeryd, K. Kjörling and O. Kunz, "Spectral Band Replication, a novel approach in audio coding," in 112th AES Convention, Munich, May 2002; S. Meltzer, R. Böhm and F. Henn, "SBR enhanced audio codecs for digital broadcasting such as "Digital Radio Mondiale" (DRM)," 112th AES Convention, Munich, May 2002; T. Ziegler, A. Ehret, P. Ekstrand and M. Lutzky, "Enhancing mp3 with SBR: Features and Capabilities of the new mp3PRO Algorithm," in 112th AES Convention, Munich, May 2002; International Standard ISO/IEC 14496-3:2001/FPDAM 1, "Bandwidth Extension," ISO/IEC, 2002, or "Speech bandwidth extension method and apparatus", Vasu Iyengar et al. U.S. Pat. No. 5,455,888.

In these methods no harmonic transposition is performed, but adjacent bandpass filterbank channels of the lower band are artificially introduced into adjacent filterbank channels of the upper band. This leads to a coarse approximation of the upper band of the audio signal. This coarse approximation of the signal is then in a further step refined by defining additional control parameters deduced from the original signal. As an example, the MPEG-4 Standard uses scale factors for adjusting the spectral envelope, a combination of inverse filtering and addition of a noise floor for adapting the tonality, and insertions of sinusoidal signal portions for supplementation of tonal components.

Apart from this, further methods exist such as the so-called "blind bandwidth extension", described in E. Larsen, R. M. Aarts, and M. Danessis, "Efficient high-frequency bandwidth extension of music and speech", In AES 112$^{th}$ Convention, Munich, Germany, May 2002 wherein no information on the original HF range is used. Further, also the method of the so-called "Artificial bandwidth extension", exists which is described in K. Käyhkö, A Robust Wideband Enhancement for Narrowband Speech Signal; Research Report, Helsinki University of Technology, Laboratory of Acoustics and Audio signal Processing, 2001.

In J. Makinen et al.: AMR-WB+: a new audio coding standard for 3$^{rd}$ generation mobile audio services Broadcasts, IEEE, ICASSP '05, a method for bandwidth extension is described, wherein the copying operation of low-frequency components into the high-band is performed by a mirroring operation obtained, for example, by upsampling the low-pass filtered signal.

As an alternative, a single side band modulation can be employed which is basically equivalent to a copying operation in the filterbank domain. Methods which enable a harmonic bandwidth extension usually employ a determination step of the pitch (pitch tracking), a non-linear distortion step (see, for example "U. Kornagel, Spectral widening of the excitation signal for telephone-band speech enhancement, in: Proceedings of the IWAENC, Darmstadt, Germany, September 2001, pp. 215-218") or make use of phase vocoders as, for example, shown by the US provisional patent application "F. Nagel, S. Disch: "Apparatus and method of harmonic bandwidth extension in audio signals"" with the application number U.S. 61/025,129.

The WO 02/41302 A1, for example, shows a method for enhancing the performance of coding systems that use high-frequency reconstruction methods. It shows how to improve the overall performance of such systems by means of an adaptation over time of the crossover frequency between the low band coded by a core coder and the high band coded by a high-frequency reconstruction system. For this method, the core coder may be able to work with different crossover frequencies at the encoder side as well as at the decoder side. Therefore, the complexity of the core coder is increased.

Further technologies for bandwidth extension are described, for example, in "R. M. Aarts, E. Larsen, and O. Ouweltjes, A unified approach to low- and high-frequency bandwidth extension. In AES 115th Convention, New York, USA, October 2003", E. Larsen and R. M. Aarts: Audio Bandwidth Extension—Application to psychoacoustics, Signal Processing and Loudspeaker Design. John Wiley & Sons, Ltd, 2004", E. Larsen, R. M. Aarts, and M. Danessis: Efficient high-frequency bandwidth extension of music and speech. In AES 112th Convention, Munich, Germany, May 2002", "J. Makhoul: Spectral Analysis of Speech by Linear Prediction. IEEE Transactions on Audio and Electroacoustics, AU-21(3), June 1973", "U.S. patent application Ser. No. 08/951,029, Ohmori et al.: Audio band width extending system and method" and "U.S. Pat. No. 6,895,375, Malah, D & Cox, R. VS.: System for bandwidth extension of Narrow-band speech".

Harmonic bandwidth extension methods often exhibits a high complexity, while methods of complexity-reduced bandwidth extension show quality losses. In the particular case where a low bit rate is combined with a small bandwidth of the low band, artifacts such as roughness and a timbre perceived as unpleasant may occur. A reason for this is the fact that the approximated HF portion is based on a copying operation which does not maintain the harmonic relations between the tonal signal portions. This applies both, to the harmonic relation between LF and HF, and also to the harmonic relation between succeeding patches within the HF portion itself. For example, within SBR, the juxtaposition of the coded components and the replicated components, occurring at the boundary between the low and the high bands, may cause rough sound impressions. The reason is illustrated in FIGS. 18A and 18B where tonal portions copied from the LF range into the HF range are spectrally densely adjacent to tonal portions of the LF range.

FIG. 18A shows the original spectrogram 1800*a* of a signal consisting of three tones. Fittingly, FIG. 18B shows a diagram 1800*b* of the bandwidth extended signal corresponding to the original signal of FIG. 18A. The abscissa indicates time and the ordinate indicates frequency. In particular, at the last tone, potential problems 1810 can be observed (smeared lines 1810).

If harmonic relations are considered by known methods, this is done on the basis of an $F_0$-estimation. In this cases, the success of these methods depends primarily on the reliability of this estimation.

In general, known bandwidth extension methods provide audio signals at a low bit rate, but with poor audio quality or a good audio quality at high bit rates.

SUMMARY

An embodiment may have a bandwidth extension decoder for providing a bandwidth extended audio signal based on an input audio signal and a parameter signal, wherein the parameter signal includes an indication of an offset frequency and a power density parameter, the bandwidth extension decoder including: a patch generator configured to generate a bandwidth extension high-frequency signal including a high-frequency band, wherein the high-frequency band of the bandwidth extension high-frequency signal is generated by performing a frequency shift of a frequency band of the input audio signal to higher frequencies, wherein the frequency shift is based on the offset frequency, and wherein the patch generator is configured to amplify or attenuate the high-frequency band of the bandwidth extension high-frequency signal by a factor equal to the value of the power density parameter or equal to the reciprocal value of the power density parameter, respectively; a combiner configured to combine the bandwidth extension high-frequency signal and the input audio signal to acquire the bandwidth extended audio signal; and an output interface configured to provide the bandwidth extended audio signal.

Another embodiment may have an audio encoder for providing an output signal using an input audio signal, including: a patch generator configured to generate at least one bandwidth extension high-frequency signal, wherein a bandwidth extension high-frequency signal includes a high-frequency band, wherein the high-frequency band of a bandwidth extension high-frequency signal is based on a low frequency band of the input audio signal, and wherein different bandwidth extension high-frequency signals include different frequencies within their high-frequency bands, if different bandwidth extension high-frequency signals are generated; a comparator configured to calculate a plurality of comparison parameters, wherein a comparison parameter is calculated based on a comparison of the input audio signal and a generated bandwidth extension high-frequency signal, wherein each comparison parameter of the plurality of comparison parameters is calculated based on a different offset frequency between the input audio signal and a generated bandwidth extension high-frequency signal, and wherein the comparator is configured to determine a comparison parameter from the plurality of comparison parameters, wherein the determined comparison parameter fulfils a predefined criterion; and an output interface configured to provide the output signal for transmission or storage, wherein the output signal includes a parameter indication based on an offset frequency corresponding to the determined comparison parameter and an indication of a power density parameter.

Another embodiment may have a method for providing a bandwidth extended audio signal based on an input audio signal and a parameter signal, wherein the parameter signal includes an indication of an offset frequency and a power density parameter, the method having the steps of: generating a bandwidth extension high-frequency signal including a high-frequency band, wherein the high-frequency band of the bandwidth extension high-frequency signal is generated by performing a frequency shift of a frequency band of the input audio signal to higher frequencies, wherein the frequency shift is based on the offset frequency; amplifying or attenuating the high-frequency band of the bandwidth extension high-frequency signal by a factor equal to the value of the power density parameter or equal to the reciprocal value of the power density parameter; combining the bandwidth extension high-frequency signal and the input audio signal to acquire the bandwidth extended audio signal; and providing the bandwidth extended audio signal.

Another embodiment may have a method for providing an output signal using an input audio signal, the method having the steps of: generating at least one bandwidth extension high-frequency signal, wherein a bandwidth extension high-frequency signal includes a high-frequency band, wherein the high-frequency band of the bandwidth extension high-frequency signal is based on a low frequency band of the input audio signal, and wherein different bandwidth extension high-frequency signals include different frequencies within their high-frequency bands, if different bandwidth extension high-frequency signals are generated; calculating a plurality of comparison parameters, wherein a comparison parameter is calculated based on a comparison of the input audio signal and a generated bandwidth extension high-frequency signal, wherein each comparison parameter of the plurality of comparison parameters is calculated based on a different offset frequency between the input audio signal and a generated bandwidth extension high-frequency signal; determining a comparison parameter from the plurality of comparison parameters, wherein the determined comparison parameter fulfils a predefined criterion; and providing the output signal for transmission or storage, wherein the output signal includes a parameter indication based on an offset frequency corresponding to the determined comparison parameter and an indication of a power density parameter.

Another embodiment may have a non-transitory digital storage medium having a computer program stored thereon to perform the method for providing a bandwidth extended audio signal based on an input audio signal and a parameter signal, wherein the parameter signal includes an indication of an offset frequency and a power density parameter, the method having the steps of: generating a bandwidth extension high-frequency signal including a high-frequency band, wherein the high-frequency band of the bandwidth extension high-frequency signal is generated by performing a frequency shift of a frequency band of the input audio signal to higher frequencies, wherein the frequency shift is based on the offset frequency; amplifying or attenuating the high-frequency band of the bandwidth extension high-frequency signal by a factor equal to the value of the power density parameter or equal to the reciprocal value of the power density parameter; combining the bandwidth extension high-frequency signal and the input audio signal to acquire the bandwidth extended audio signal; and providing the bandwidth extended audio signal, when said computer program is run by a computer.

Another embodiment may have a non-transitory digital storage medium having a computer program stored thereon to perform the method for providing an output signal using an input audio signal, the method having the steps of: generating at least one bandwidth extension high-frequency signal, wherein a bandwidth extension high-frequency signal includes a high-frequency band, wherein the high-frequency band of the bandwidth extension high-frequency signal is based on a low frequency band of the input audio signal, and wherein different bandwidth extension high-frequency signals include different frequencies within their high-frequency bands, if different bandwidth extension high-frequency signals are generated; calculating a plurality of comparison parameters, wherein a comparison parameter is calculated based on a comparison of the input audio signal and a generated bandwidth extension high-frequency signal, wherein each comparison parameter of the plurality of comparison parameters is calculated based on a different offset frequency between the input audio signal and a generated bandwidth extension high-frequency signal; determining a comparison parameter from the plurality of comparison parameters, wherein the determined comparison parameter fulfils a predefined criterion; and providing the output signal for transmission or storage, wherein the output signal includes a parameter indication based on an offset frequency corresponding to the determined comparison parameter and an indication of a power density parameter, when said computer program is run by a computer.

An embodiment of the invention provides an audio encoder for providing an output signal using an input audio signal. The audio encoder comprises a patch generator, a comparator and an output interface.

The patch generator is configured to generate at least one bandwidth extension high-frequency signal. A bandwidth extension high-frequency signal comprises a high-frequency band, wherein the high-frequency band of the bandwidth extension high-frequency signal is based on a low frequency band of the input audio signal. Different bandwidth extension high-frequency signals comprise different frequencies within their high-frequency bands if different bandwidth extension high-frequency signals are generated.

The comparator is configured to calculate a plurality of comparison parameters. A comparison parameter is calculated based on a comparison of the input audio signal and a generated bandwidth extension high-frequency signal. Each comparison parameter of the plurality of comparison parameters is calculated based on a different offset frequency between the input audio signal and a generated bandwidth extension high-frequency signal. Further, the comparator is configured to determine a comparison parameter from the plurality of comparison parameters, wherein the determined comparison parameter fulfils a predefined criterion.

In other words, for example, the comparator may be configured to determine the comparison parameter among the plurality of comparison parameters which fulfils at best a predefined criterion.

The output interface is configured to provide the output signal for transmission or storage. The output signal comprises a parameter indication based on an offset frequency corresponding to the determined comparison parameter.

In other words, the output signal may comprise the selected comparison parameter indicating the optimal offset frequency.

Another embodiment of the invention provides a bandwidth extension decoder for providing a bandwidth extended audio signal based on an input audio signal and a parameter signal. The parameter signal comprises an indication of an offset frequency and an indication of a power density parameter. The bandwidth extension decoder comprises a patch generator, a combiner, and an output interface.

The patch generator is configured to generate a bandwidth extension high-frequency signal comprising a high-frequency band. The high-frequency band of the bandwidth extension high-frequency signal is generated based on one or more frequency shifts of a frequency band of the input audio signal. The frequency shifts are based on the offset frequency.

Further the patch generator is configured to be able to amplify or attenuate the high-frequency band of the bandwidth extension high-frequency signal by a factor equal to the value of the power density parameter or equal to the reciprocal value of the power density parameter, respectively.

The combiner is configured to combine the bandwidth extension high-frequency signal and the input audio signal to obtain the bandwidth extended audio signal.

The output interface is configured to provide the bandwidth extended audio signal.

A further embodiment of the invention provides a bandwidth extension decoder for providing a bandwidth extended audio signal based on an input audio signal. The bandwidth extension decoder comprises a patch generator, a comparator, a combiner, and an output interface.

The patch generator is configured to generate at least one bandwidth extension high-frequency signal comprising a high-frequency band based on the input audio signal, wherein a lower cutoff frequency of the high-frequency band of a generated bandwidth extension high-frequency signal is lower than an upper cutoff frequency of the input audio signal. Different generated bandwidth extension high-frequency signals comprise different frequencies within their high-frequency bands, if different bandwidth extension high-frequency signals are generated.

The comparator is configured to calculate a plurality of comparison parameters. A comparison parameter is calculated based on a comparison of the input audio signal and a generated bandwidth extension high-frequency signal. Each comparison parameter of the plurality of comparison parameters is calculated based on a different offset frequency between the input audio signal and the generated bandwidth extension high-frequency signal. Further, the comparator is configured to determine a comparison parameter from the plurality of comparison parameters, wherein the determined comparison parameter fulfils a predefined criterion.

In other words, for example, the comparator is configured to determine the comparison parameter among the plurality of comparison parameters which fulfils at best a predefined criterion.

The combiner is configured to combine the input audio signal and a bandwidth extension high-frequency signal to obtain the bandwidth extended audio signal, wherein the bandwidth extension high-frequency signal used to obtain the bandwidth extended audio signal is based on an offset frequency corresponding to the determined comparison parameter.

The output interface is configured to provide the bandwidth extended audio signal.

Embodiments according to the present invention are based on the central idea that a bandwidth extension high-frequency signal which is also called patch, may be generated and compared with the original input audio signal. By using a different offset frequency of the bandwidth extension high-frequency signal or several bandwidth extension high-frequency signals with different offset frequencies, a plurality of comparison parameters corresponding to the different offset frequencies may be calculated. The comparison parameters may be related to a quantity associated with the audio quality. Therefore, a comparison parameter may be determined assuring the compatibility of the bandwidth extension high-frequency signal and the input audio signal, and as a consequence making the audio quality improve.

The bit rate for transmission or storage of the encoded audio signal may be decreased by using a parameter indication based on the offset frequency corresponding to the determined comparison parameter for a reconstruction of the high-frequency band of the original input audio signal. In this way, only a low frequency portion of the input audio signal and the parameter indication need to be stored or transmitted.

The terms comparison parameter, xover frequency and parameter indication will be defined later on.

Some embodiments according to the invention relate to a comparator using a cross correlation for the comparison of the input audio signal and the generated bandwidth extension high-frequency signal to calculate the comparison parameter.

Some further embodiments according to the invention relate to a patch generator, generating the bandwidth extension high-frequency signal in the time domain based on a single side band modulation.

It is an advantage of embodiments of the invention that an improved coding scheme for audio signals which allow increasing the audio quality and/or decreasing the bit rate for transmission or storage, is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
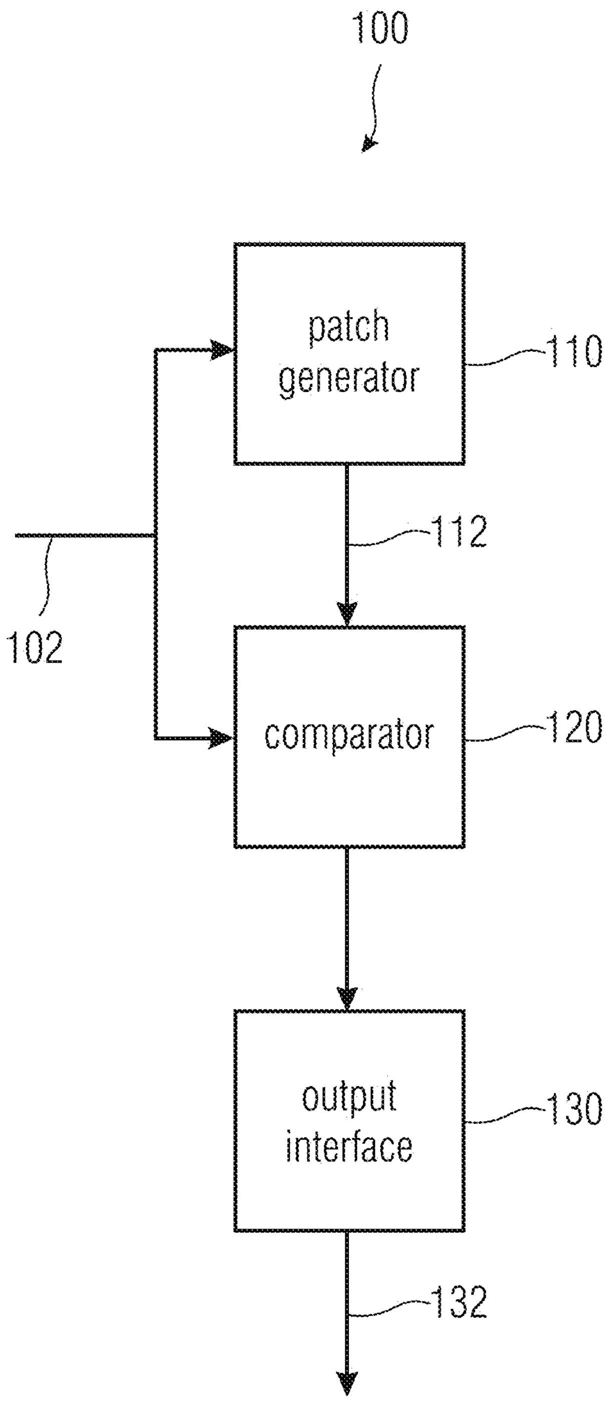
FIG. 1 is a block diagram of an audio encoder.

In the following, the same reference numerals are partly used for objects and functional units having the same or similar functional properties and the description thereof with regard to a figure shall apply also to other figures in order to reduce redundancy in the description of the embodiments.

FIG. 1 shows a block diagram of an audio encoder 100 for providing an output signal 132 according to an embodiment of the invention, using an input audio signal 102. The output signal is suitable for a bandwidth extension at a decoder. Therefore the audio encoder is also called bandwidth extension encoder. The bandwidth extension encoder 100 comprises a patch generator 110, a comparator 120 and an output interface 130. The patch generator 110 is connected to the comparator 120 and the comparator 120 is connected to the output interface 130.

The patch generator 110 generates at least one bandwidth extension high-frequency signal 112. A bandwidth extension high-frequency signal 112 comprises a high-frequency band, wherein the high-frequency band of the bandwidth extension high-frequency signal 112 is based on a low frequency band of the input audio signal 102. If different bandwidth extension high-frequency signals 112 are generated, the different bandwidth extension high-frequency signals 112 comprise different frequencies within their high-frequency bands.

The comparator 120 calculates a plurality of comparison parameters. A comparison parameter is calculated based on a comparison of the input audio signal 102 and a generated bandwidth extension high-frequency signal 112. Each comparison parameter of the plurality of comparison parameters is calculated based on a different offset frequency between the input audio signal 102 and a generated bandwidth extension high-frequency signal 112. Further, the comparator 120 determines a comparison parameter from the plurality of comparison parameters, wherein the determined comparison parameter fulfils a predefined criterion.

The output interface 130 provides the output signal 132 for transmission or storage. The output signal 132 comprises a parameter indication based on an offset frequency corresponding to the determined comparison parameter.

By calculating a plurality of comparison parameters for different offset frequencies, a bandwidth extension high-frequency signal 112 may be found which fits well to the original input audio signal 102. This may be done by generating a plurality of bandwidth extension high-frequency signals 112 each with a different offset frequency or by generating one bandwidth extension high-frequency signal and shifting the high frequency band of the bandwidth extension high-frequency signal 112 by different offset frequencies. Also a combination of generating a plurality of bandwidth extension high-frequency signals 112 with different offset frequencies and shifting the high frequency band of them by other different offset frequencies may be possible. For example, five different bandwidth extension high-frequency signals 112 are generated and each of them is shifted five times by a constant frequency offset.

Figure 2:
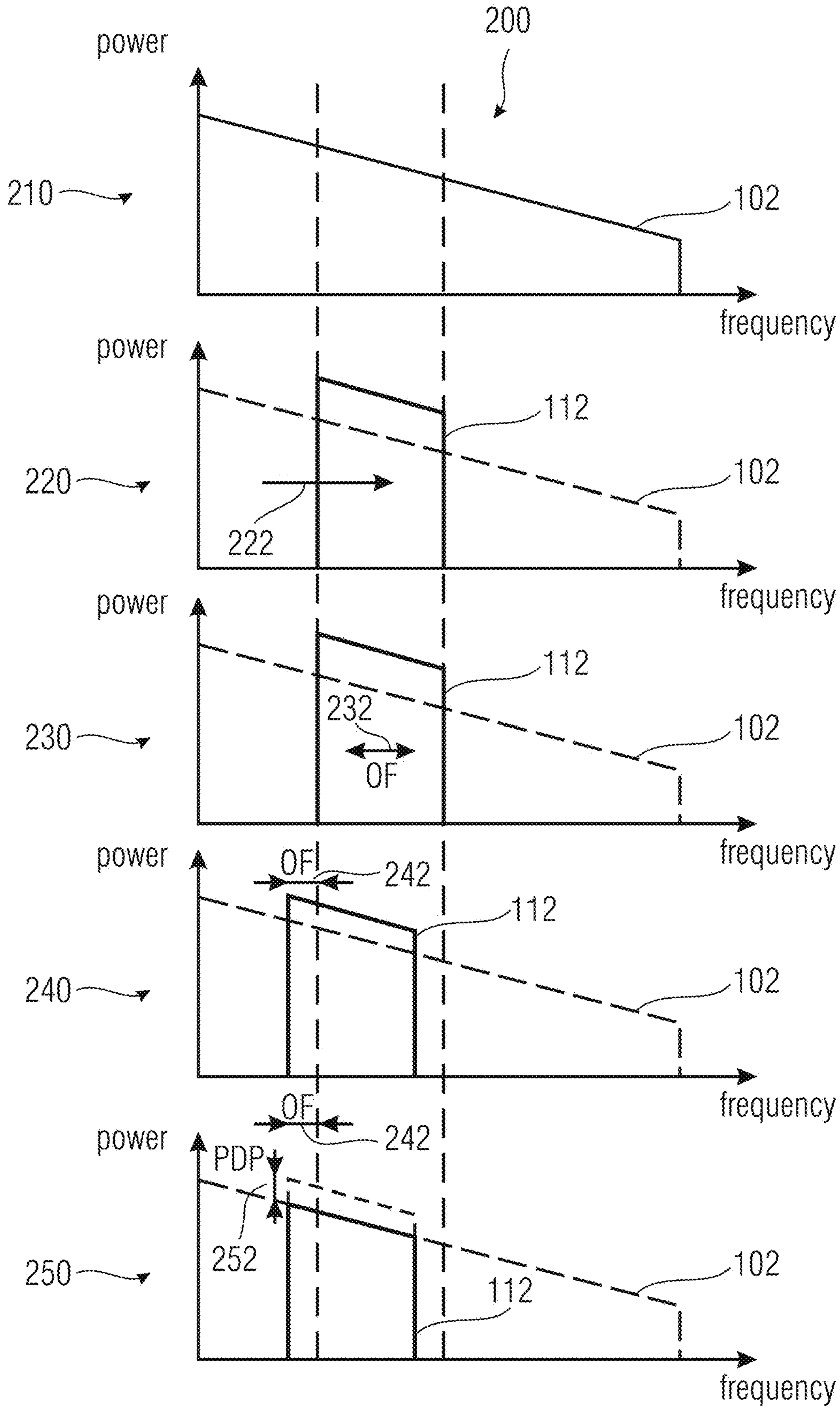
FIG. 2 is a schematic illustration of a bandwidth extension high-frequency signal generation, a comparison of the input audio signal and a generated bandwidth extension high-frequency signal and a power adaptation of the bandwidth extension high-frequency signal.

FIG. 2 shows a schematic illustration 200 of a bandwidth extension high-frequency signal generation, a comparison of the bandwidth extension high-frequency signal and the input audio signal and an optional power adaptation of the bandwidth extension high-frequency signal for the case that only one bandwidth extension high-frequency signal is generated and shifted by different offset frequencies.

The first schematic "power vs. frequency" diagram 210 shows schematically an input audio signal 102. Based on this input audio signal 102, the patch generator 110 may generate the bandwidth extension high-frequency signal 112, for example, by shifting 222 a low frequency band of the input audio signal 102 to higher frequencies (as indicated by reference numeral). For example, the low frequency band is shifted by a frequency equal to a crossover frequency of a core coder, not illustrated in FIG. 1, which may be a part of the bandwidth extension encoder 100 or another predefined frequency.

The generated bandwidth extension high-frequency signal 112 may then be shifted by different offset frequencies 232 and for each offset frequency 232 (as indicated by reference numeral 230), a comparison parameter may be calculated by the comparator 120. The offset frequency 232 may be, for example, defined relative to a crossover frequency of a core coder, relative to another specific frequency or may be defined as an absolute frequency value.

Next, the comparator 120 determines a comparison parameter fulfilling the predefined criterion. In this way, a bandwidth extension high-frequency signal 112 with an offset frequency 242 corresponding to the determined comparison parameter may be determined (as shown at reference numeral 240).

Additionally, also a power density parameter 252 may be determined (as indicated by reference numeral 250). The power density parameter 252 may indicate a ratio of the high-frequency band of the bandwidth extension high-frequency signal with the offset frequency corresponding to the determined comparison parameter and a corresponding frequency band of the input audio signal. For example, the ratio may relate to a power density ratio, a power ratio, or another ratio of a quantity related to the power density of a frequency band.

Figure 3:
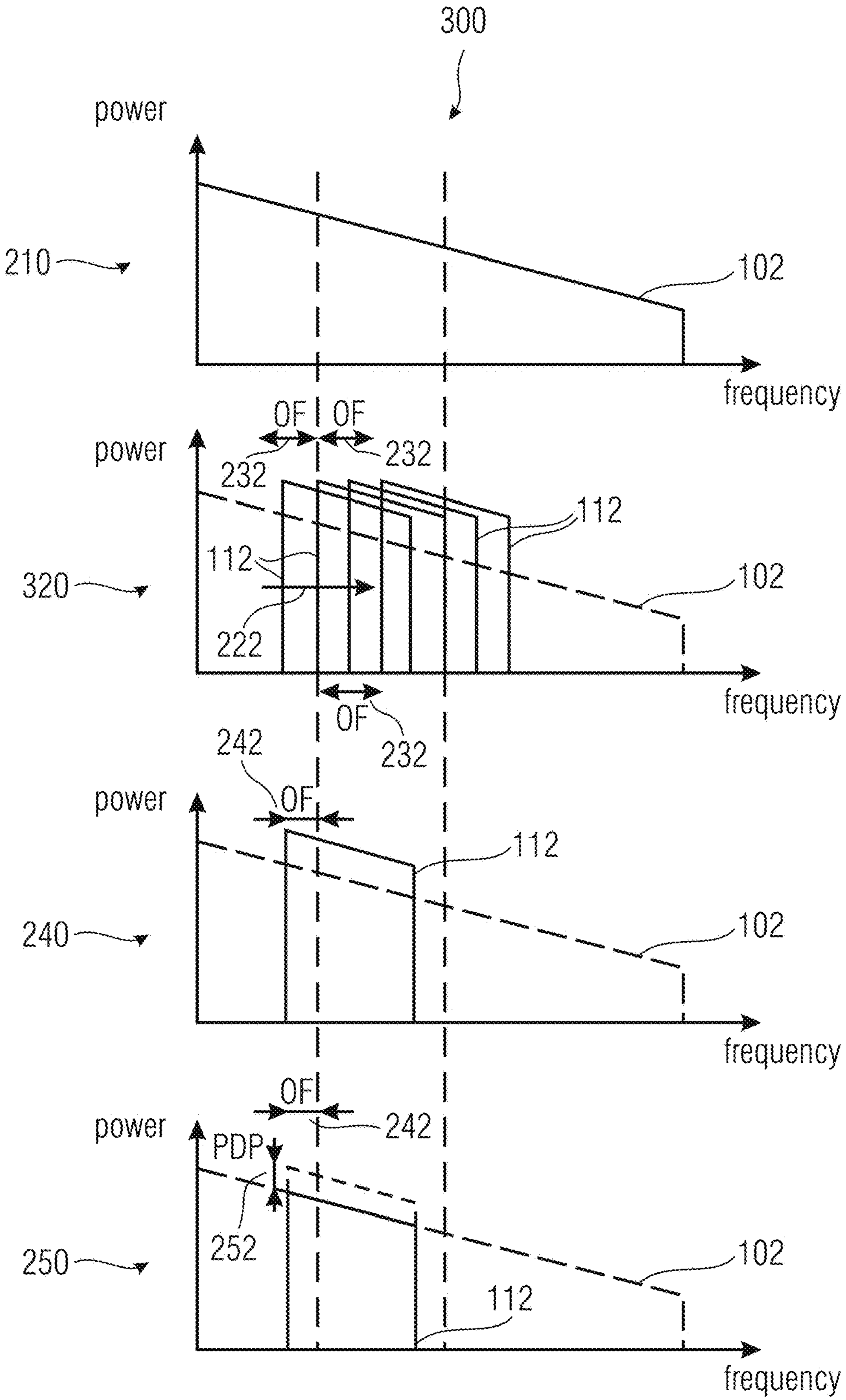
FIG. 3 is a schematic illustration of a bandwidth extension high-frequency signal generation, a comparison of the input audio signal and a bandwidth extension high-frequency signal and a power adaptation of the bandwidth extension high-frequency signal.

Alternatively, FIG. 3 shows a schematic illustration 300 of a bandwidth extension high-frequency signal generation, a comparison of the generated bandwidth extension high-frequency signals and the input audio signal and an optional power adaptation of the bandwidth extension high-frequency signal for the case that a plurality of bandwidth extension high-frequency signals with different offset frequencies are generated.

In difference to the sequence shown in FIG. 2, the patch generator 110 generates a plurality of bandwidth extension high-frequency signals 112 with different offset frequencies 232 (as indicated by reference numeral 320). This may again be done by a frequency shift 222 of a low frequency band of the input audio signal 102 to higher frequencies. The low frequency band of the input audio signal 102 may be shifted by a constant frequency plus the individual offset frequency 232 of each bandwidth extension high-frequency signal 112. The constant frequency may be equal to the crossover frequency of the core coder or another specific frequency.

A comparison parameter for each generated bandwidth extension high-frequency signal 112 may then be calculated and the comparison parameter fulfilling the predefined criterion may be determined 240 by the comparator 120.

The power density parameter may be determined 250 as described before.

The concepts shown in FIGS. 2 and 3 may also be combined.

The comparison of the input audio signal 102 and the generated bandwidth extension high-frequency signal 112 may be done by a cross correlation of both signals. In this case, a comparison parameter may be, for example, the result of a cross correlation for a specific offset frequency between the input audio signal 102 and a generated bandwidth extension high-frequency signal 112.

The parameter indication of the output signal 132 may be the offset frequency itself, a quantized offset frequency or another quantity based on the offset frequency.

By transmitting or storing only the parameter indication instead of the high-frequency band of the input audio signal 102, the bit rate for transmission or storage may be reduced. By choosing the parameter based on the offset frequency corresponding to a comparison parameter fulfilling a predefined criterion, this may yield in a better audio quality than decoding only the band-limited audio signal.

A predefined criterion may be to determine a comparison parameter of the plurality of comparison parameters indicating, for example, a bandwidth extension high-frequency signal 112 with an corresponding offset frequency matching the input audio signal 102 better than 70% of the bandwidth extension high-frequency signals 112 with other offset frequencies, indicating a bandwidth extension high-frequency signal 112 with an corresponding offset frequency being one of the best three matches to the input audio signal 102 or indicating a best-matching bandwidth extension high-frequency signal 112 with an corresponding offset frequency. This relates to the case where a plurality of bandwidth extension high-frequency signals 112 with different offset frequencies are generated as well as to the case where only one bandwidth extension high-frequency signal 112 is generated and shifted by different offset frequencies or a combination of these two cases.

A comparison parameter may be the result of a cross correlation or another quantity indicating how well a bandwidth extension high-frequency signal 112 with a specific offset frequency matches the input audio signal 102.

The bandwidth extension encoder 100 may comprise a core coder for encoding a low frequency band of the input audio signal 102. This core coder may comprise a crossover frequency which may correspond to the upper cutoff frequency of the encoded low frequency band of the input audio signal 102. The crossover frequency of the core coder may be constant or variable over time. Implementing a variable crossover frequency may increase the complexity of the core coder, but may also increase the flexibility for encoding.

The process shown in FIG. 2 and/or FIG. 3 may be repeated for higher frequency bands or patches. For example, the low frequency band of the input audio signal 102 comprises an upper cutoff frequency of 4 kHz. Therefore, if the low frequency band of the input audio signal 102 is shifted by the upper cutoff frequency of the low frequency band to generate the bandwidth extension high-frequency signal 112, the bandwidth extension high-frequency signal 112 comprises a high-frequency band with a lower cutoff frequency of 4 KHz and an upper cutoff frequency of 8 kHz. The process may be repeated by shifting a low frequency band of the input audio signal 102 by two times the upper cutoff frequency of the low frequency band. So, the new generated bandwidth extension high-frequency signal 112 comprises a high-frequency band with a lower cutoff frequency of 8 KHz and an upper cutoff frequency of 12 kHz. This may be repeated until a desired highest frequency is reached. Alternatively, this may also be realized by generating one bandwidth extension high frequency signal with a plurality of different high frequency bands.

As illustrated in this example, the bandwidth of the low frequency band of the input audio signal and the bandwidth of a high frequency band of a bandwidth extension high frequency signal may be the same. Alternatively, the low frequency band of the input audio signal may be spread and shifted to generate the bandwidth extension high frequency signal.

Determining a bandwidth extension high-frequency signal 112 with an offset frequency 232 corresponding to the determined comparison parameter may leave a gap between the low frequency band of the input audio signal 102 and the high frequency band of the bandwidth extension high-frequency signal 112 depending on the offset frequency 242. This gap may be filled by generating frequency portions fitting this gap containing e.g. band limited noise. Alternatively, the gap may be left empty, since the audio quality may not suffer dramatically.

Figure 4:
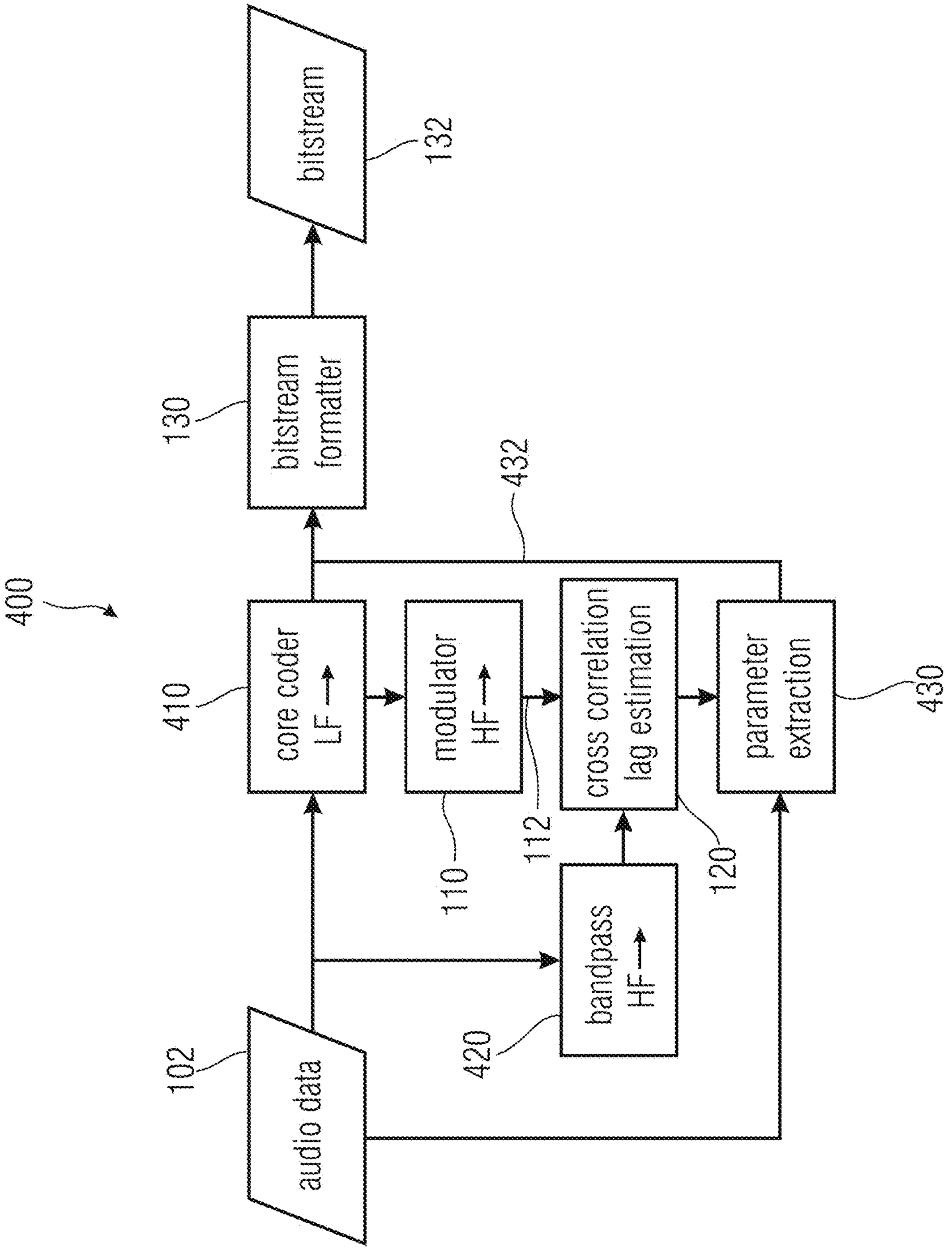
FIG. 4 is a block diagram of an bandwidth extension encoder.

FIG. 4 shows a block diagram of an bandwidth extension encoder 400 for providing an output signal 132 using an input audio signal 102 according to an embodiment of the invention. The bandwidth extension encoder 400 comprises a patch generator 110, a comparator 120, an output interface 130, a core coder 410, a bandpass filter 420 and a parameter extraction unit 430. The core coder 410 is connected to the output interface 130 and the patch generator 110, the patch generator 110 is connected to the comparator 120, the comparator 120 is connected to the parameter extraction unit 430, the parameter extraction unit 430 is connected to the output interface 130 and the bandpass filter 420 is connected to the comparator 120.

The patch generator 110 may be realized as a modulator for generating the bandwidth extension high-frequency signal 112 based on the input audio signal 102. The comparator 120 may perform the comparison of the input audio signal 102 filtered by the bandpass filter 420 and the generated bandwidth extension high-frequency signal 112 by a cross correlation of them. The determination of the comparison parameter fulfilling the predefined criterion may also be called lag estimation.

The output interface 130 may also include a functionality of a bitstream formatter and may comprise a combiner for combining a low frequency signal provided by the core coder 410 and a parameter signal 432 comprising the parameter indication based on the offset frequency provided by the parameter extraction unit 430. Further, the output interface 130 may comprise an entropy coder or a differential coder to reduce the bit rate of the output signal 132. The combiner and the entropy or differential coder may be part of the output interface 130 as shown in this example or may be independent units.

The audio signal 102 may be divided in a low frequency part and a high-frequency part. This may be done by a low-pass filter of the core coder 410 and the band-pass filter 420. The low-pass filter may be part of the core coder 410 or an independent low-pass filter connected to the core coder 410.

The low frequency part is processed by a core encoder 410 which can be an audio coder, for example, conforming to the MPEG1/2 Layer 3 “MP3” or MPEG 4 AAC standard or a speech coder.

The low frequency part may be shifted by a fixed value, for example, by means of a side band modulation or a Fast Fourier transformation (FFT) in the frequency domain, so that it is located above the original low frequency region in the target area of the corresponding patch. Optional, the low frequency part may be obtained directly from the input signal 102. This may be done by an independent low-pass filter connected to the patch generator 110.

In regular time intervals, the cross correlation between amplitude spectra of windowed signal sections between the original high-frequency part (of the input audio signal) and the obtained high-frequency part (the bandwidth extension high-frequency signal) may be calculated. In this way, the lag (the offset frequency) for maximum correlation may be determined. This lag may have the meaning of a correction factor in terms of the original single side band modulation, i.e. the single side band modulation may be additionally corrected by the lag to maximize the cross correlation. In other words, the offset frequency, which is also called lag, corresponding to the comparison parameter fulfilling the predefined criterion may be determined, wherein the comparison parameter corresponds to the cross correlation and the predefined criterion may be finding the maximum correlation.

In addition, the ratios of the absolute values of the amplitude spectra may be determined. By this, it may be derived by which factor the obtained high-frequency signal should be attenuated or amplified. In other words, a power density parameter may be determined indicating a ratio of the power, the power densities, the absolute values of the amplitude spectra or another value related to the power density ratio between the high-frequency band of the bandwidth extension high-frequency signal 112 and a corresponding frequency band of the original input audio signal 102. This may be done by a power density comparator which may be a part of the parameter extraction unit 430 as in the shown example or an independent unit. For determining the power density parameter, for example, the bandwidth extension high-frequency signal 112 which was generated by shifting the low frequency band of the input audio signal 102 by a constant frequency or the bandwidth extension high-frequency signal 112 corresponding to the determined comparison parameter or another generated bandwidth extension high-frequency signal 112 may be used. A corresponding frequency band in this case means, for example, a frequency band with the same frequency range. For example, if the high frequency band of the bandwidth extension high frequency signal comprises frequencies form 4 kHz to 8 kHz, then the corresponding frequency band of the input audio signal comprises also the range from 4 kHz to 8 kHz.

The obtained correction factors (offset frequency, power density parameter) corresponding to the lag and corresponding to the absolute value of the amplitude may be interpolated over time. In other words, a parameter determined for a windowed signal section (for a time frame) may be interpolated for each time step of the signal section.

This modulation (control) signal (parameter signal) or a parameterized representation of it may be stored or transmitted to a decoder. In other words, the parameter signal 432 may be combined with the low frequency band of the input audio signal 102 processed by the core coder 410 to obtain the output signal 132 which may be stored or transmitted to a decoder.

Additionally, further parameters for adapting, for example, a noise level and/or the tonality may be determined. This may be done by the parameter extraction unit 430. The further parameters may be added to the parameter signal 432.

The example shown in FIG. 4 illustrates an encoder-sided calculation of a time variable modulation. Time variable modulation in this case relates to the bandwidth extension high-frequency signals 112 with different offset frequencies. The offset frequency corresponding to the determined comparison parameter fulfilling the predefined criterion may vary over time.

Figure 5:
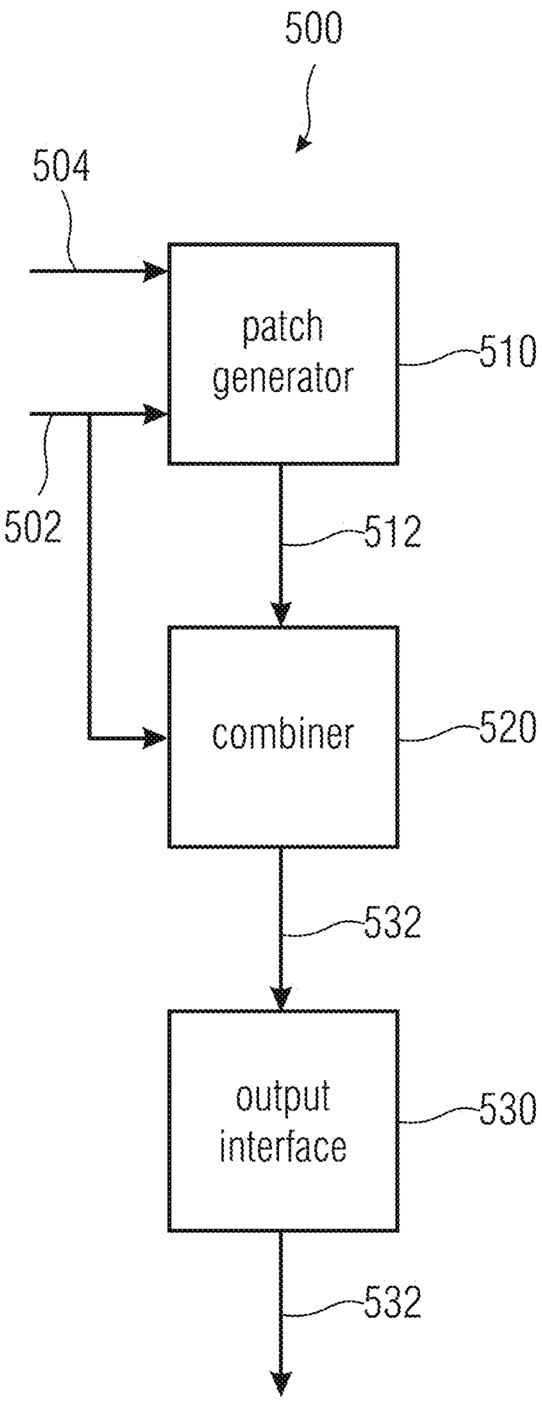
FIG. 5 is a block diagram of a bandwidth extension decoder.

FIG. 5 shows a block diagram of a bandwidth extension decoder 500 for proving a bandwidth extended audio signal 532 based on an input audio signal 502 and a parameter signal 504 according to an embodiment of the invention. The parameter signal 504 comprises an indication of an offset frequency and an indication of a power density parameter. The bandwidth extension decoder 500 comprises a patch generator 510, a combiner 520 and an output interface 530. The patch generator 510 is connected to the combiner 520 and the combiner 520 is connected to the output interface 530.

The patch generator 510 generates a bandwidth extension high-frequency signal 512 comprising a high-frequency band based on the input audio signal 502. The high-frequency band of the bandwidth extension high-frequency signal 512 is generated based on a frequency shift of a frequency band of the input audio signal 502, wherein the frequency shift is based on the offset frequency.

Further, the patch generator 510 amplifies or attenuates the high-frequency band of the bandwidth extension high-frequency signal 512 by a factor equal to the value of the power density parameter or equal to the reciprocal value of the power density parameter.

The combiner 520 combines the bandwidth extension high-frequency signal 512 and the input audio signal 502 to obtain the bandwidth extended audio signal 532 and the output interface 530 provides the bandwidth extended audio signal 532.

Generating the bandwidth extension high-frequency signal 112 based on the offset frequency may allow an improved continuation of the frequency range of the input audio signal in the high-frequency region, for example, if the offset frequency is determined as described before. This may increase the audio quality of the bandwidth extended audio signal 532.

Additionally, the power density of the high-frequency continuation of the input audio signal 502 may be done in a very efficient way by amplifying or attenuating the high-frequency band of the bandwidth extension high-frequency signal 512 by the power density parameter. In this way, a normalization may not be necessary.

The patch generator 510 may generate the bandwidth extension high-frequency signal 512 by shifting the frequency band of the input audio signal 512 by a constant frequency plus the offset frequency. If the offset frequency indicates a frequency shift to lower frequencies, the combiner may ignore a part of the high-frequency band of the bandwidth extension high-frequency signal 512 comprising frequencies lower than an upper cutoff frequency of the input audio signal 502.

The patch generator 510 may generate the bandwidth extension high-frequency signal 512 in the time domain or in the frequency domain. In the time domain, the patch generator 510 may generate the bandwidth extension high-frequency signal 512 based on a single side band modulation.

Additionally, the output interface may amplify the output signal before providing it.

Figure 6:
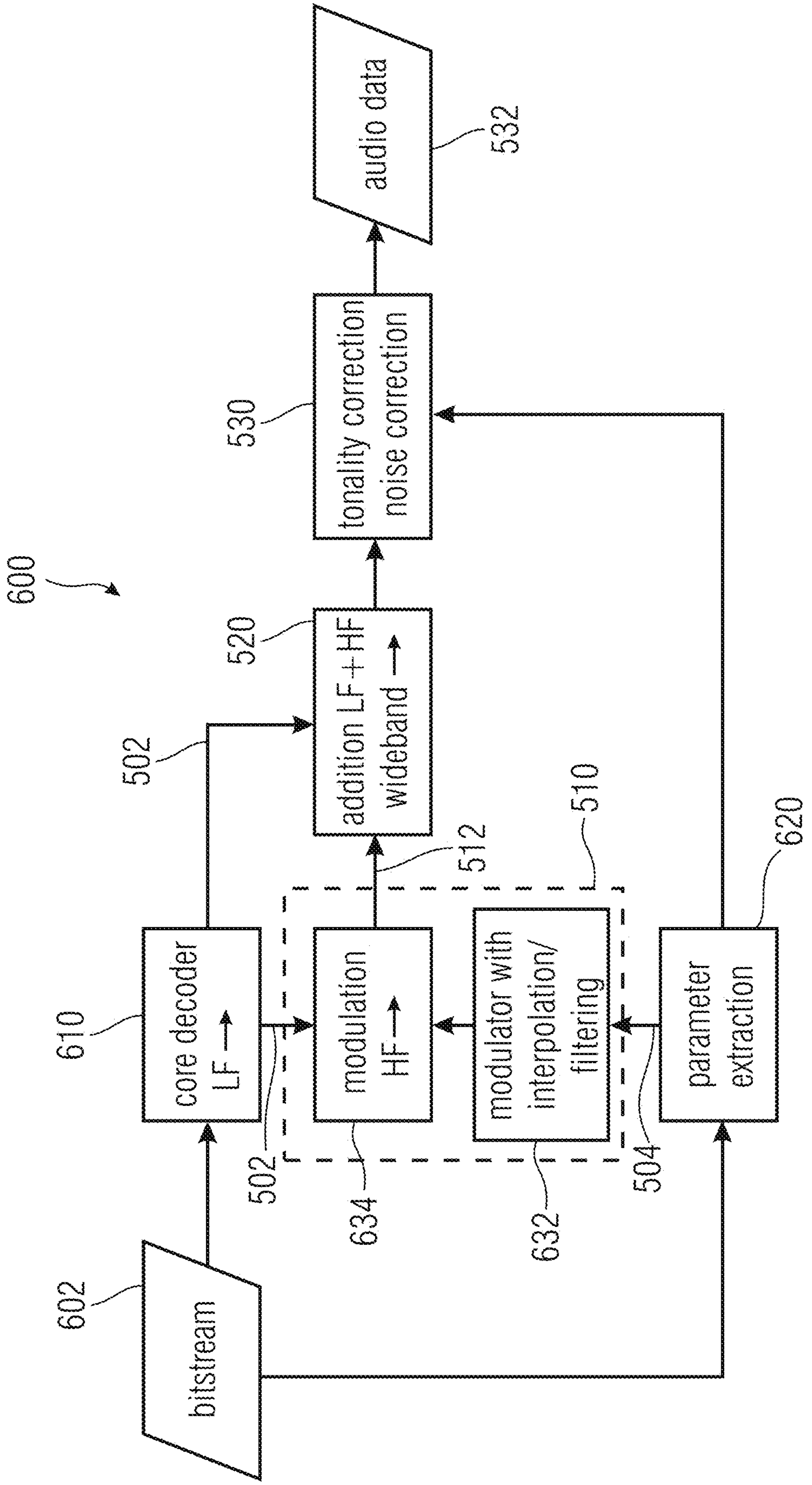
FIG. 6 is a block diagram of a bandwidth extension decoder.

FIG. 6 shows a block diagram of a bandwidth extension decoder 600 for providing a bandwidth extended audio signal 532 based on an input audio signal 502 and a parameter signal 504 according to an embodiment of the invention. The bandwidth extension decoder 600 comprises a patch generator 510, a combiner 520, an output interface 530, a core decoder 610 and a parameter extraction unit 620. The core decoder 610 is connected to the patch generator 510 and the combiner 520, the parameter extraction unit 620 is connected to the patch generator 510 and to the output interface 530, the patch generator 510 is connected to the combiner 520 and the combiner 520 is connected to the output interface 530.

The core decoder 610 may decode the received bit stream 602 and provide the input audio signal 502 to the patch generator 510 and the combiner 520. The input audio signal 502 may comprise an upper cutoff frequency equal to a crossover frequency of the core decoder 610. This crossover frequency may be constant or variable over time. Variable over time means, for example, variable for different time intervals or time frames, but constant for one time interval or time frame.

The parameter extraction unit 620 may separate the parameter signal 504 from the received bit stream 602 and provide it to the patch generator 510. Additionally, the parameter signal 504 or an extracted noise and/or tonality parameter may be provided to the output interface 530.

The patch generator 510 may modulate the input audio signal 502 based on the offset frequency to obtain the bandwidth extension high-frequency signal 512 and may amplify or attenuate the bandwidth extension high-frequency signal 512 based on the power density parameter comprised in the parameter signal 504. This bandwidth extension high-frequency signal 512 is provided to the combiner 530. In other words, the patch generator 510 may modulate the input audio signal 502 based on the offset frequency and the power density parameter to obtain a high-frequency signal. This may be done, for example, in the time domain by a single side band modulation 634 with an interpolation and/or filtering 632 for each time step.

The combiner 520 combines the input audio signal 502 and the generated bandwidth extension high-frequency signal 512 to obtain the bandwidth extension audio signal 532.

The output interface 530 provides the bandwidth extended audio signal 532 and may additionally comprise a correction unit. The correction unit may carry out a tonality correction and/or a noise correction based on parameters provided by the parameter extraction unit 620. The correction unit may be part of the output interface 530 as shown in FIG. 6 or may be an independent unit. The correction unit may also be arranged between the patch generator 510 and the combiner 520. In this way, the correction unit may only correct tonality and/or noise of the generated bandwidth extension high-frequency signal 512. A tonality and noise correction of the input audio signal 512 is not necessary since the input audio signal 502 corresponds to the original audio signal.

Summarized in some words, the bandwidth extension decoder 600 may synthesize and spectrally form a high-frequency signal out of an output signal of the audio decoder or core decoder (the input audio signal) by means of the transmitted modulation function. Transmitted modulation function, for example, means a modulation function based on the offset frequency and on the power density parameter. Then the high-frequency signal and the low frequency signal may be combined and further parameters for adapting the noise level and tonality may be applied.

Figure 7:
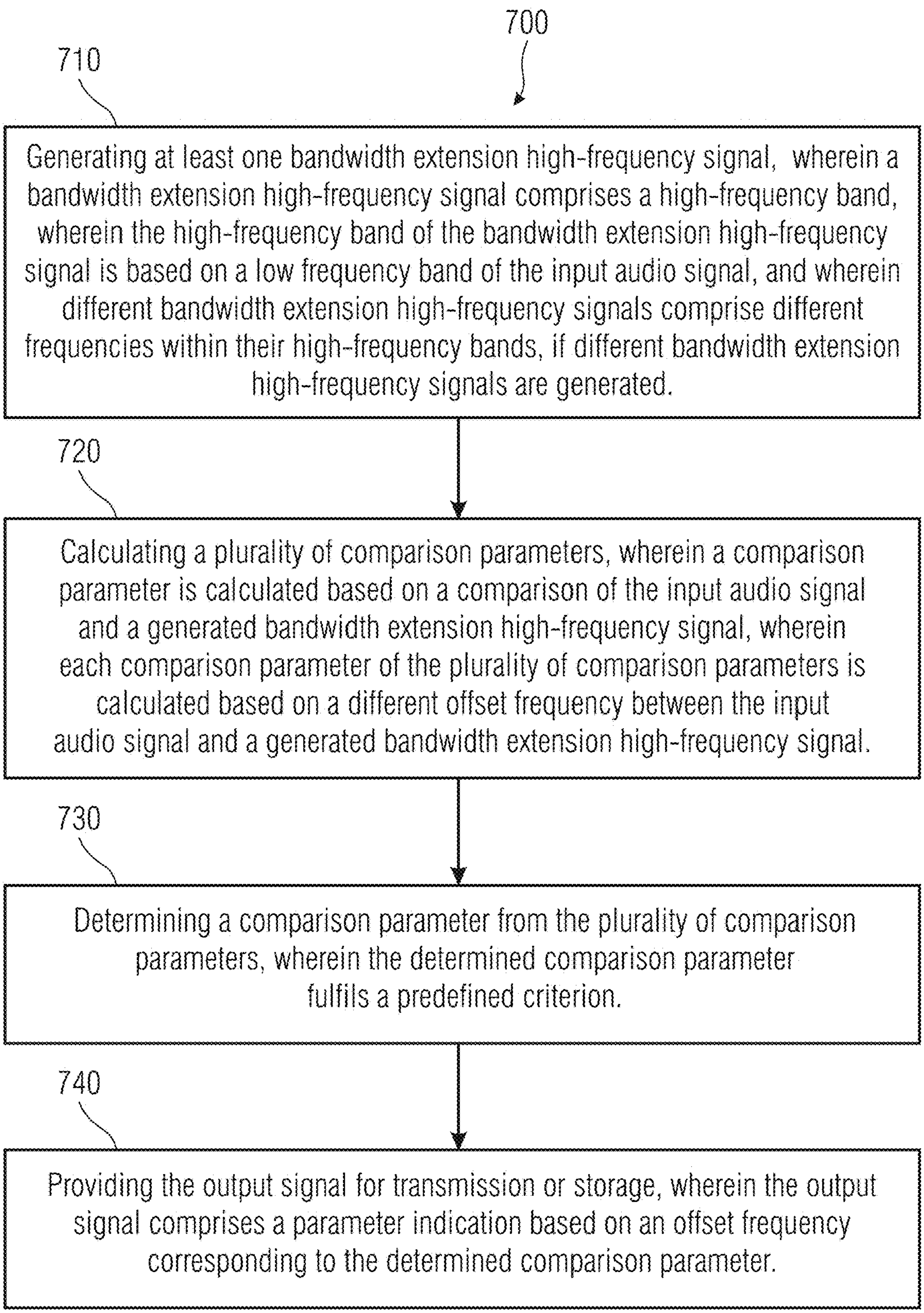
FIG. 7 is a flow chart of a method for providing an output signal based on an input audio signal.

FIG. 7 shows a flowchart of a method 700 for providing an output signal based on an input audio signal according to an embodiment of the invention. The method comprises generating 710 at least one bandwidth extension high-frequency signal, calculating 720 a plurality of comparison parameters, determining 730 a comparison parameter from the plurality of comparison parameters and providing 740 the output signal for transmission or storage.

A generated bandwidth extension high-frequency signal comprises a high-frequency band. The high-frequency band of the bandwidth extension high-frequency signal is based on a low frequency band of the input audio signal. Different bandwidth extension high-frequency signals comprise different frequencies within their high-frequency bands, if different bandwidth extension high-frequency signals are generated.

A comparison parameter is calculated based on a comparison of the input audio signal and a generated bandwidth extension high-frequency signal. Each comparison parameter of the plurality of comparison parameters is calculated based on a different offset frequency between the input audio signal and a generated bandwidth extension high-frequency signal.

The determined comparison parameter fulfils a predefined criterion.

The output signal comprises a parameter indication based on an offset frequency corresponding to the determined comparison parameter.

Figure 8:
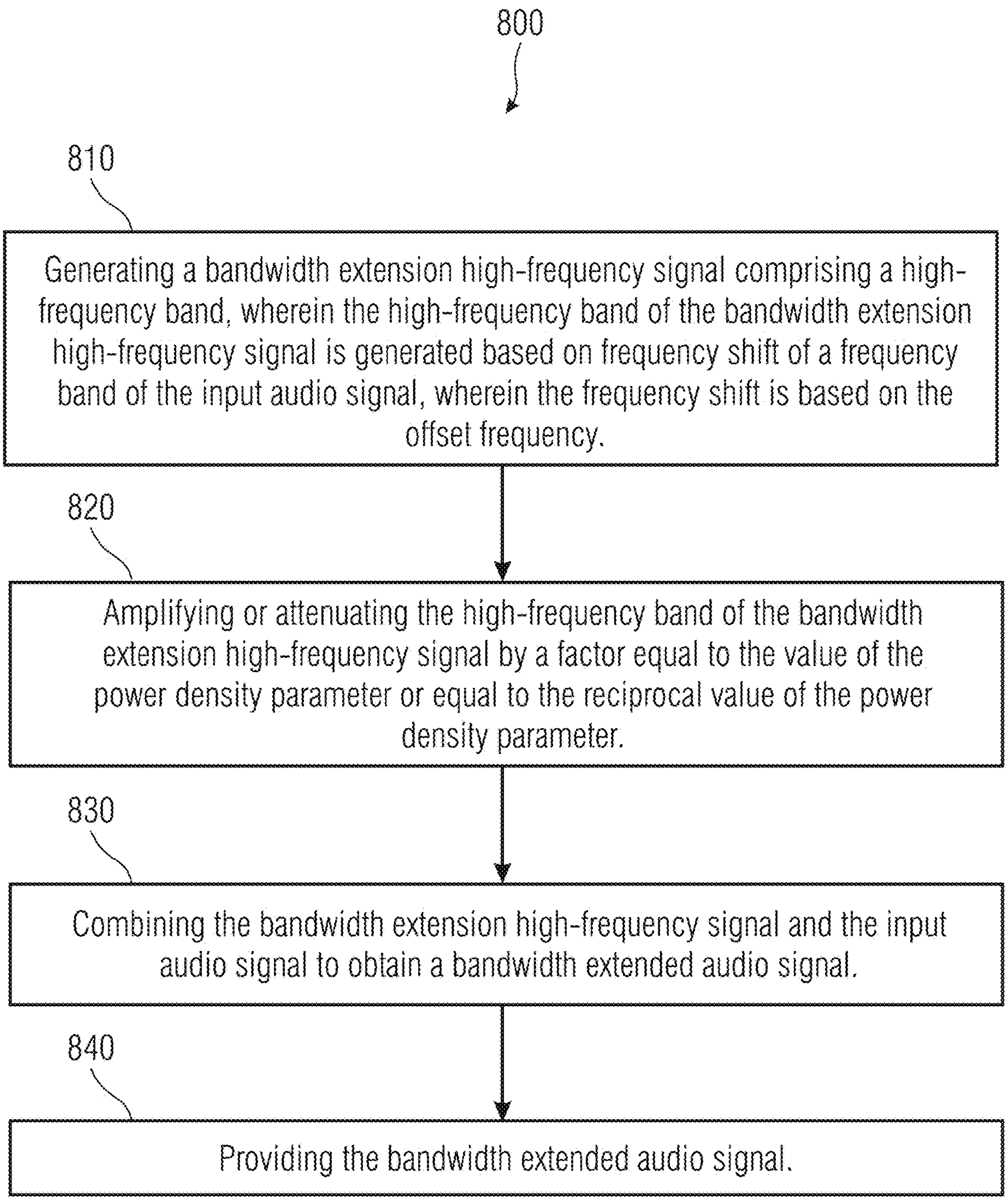
FIG. 8 is a flow chart of a method for providing a bandwidth extended audio signal.

FIG. 8 shows a flowchart of a method 800 for providing a bandwidth extended audio signal based on an input audio signal and a parameter signal according to an embodiment of the invention. The parameter signal comprises an indication of an offset frequency and an indication of a power density parameter. The method comprises generating 810 a bandwidth extension high-frequency signal, amplifying 820 or attenuating the high-frequency band of the bandwidth extension high-frequency signal, combining 830 the bandwidth extension high-frequency signal and the input audio signal to obtain the bandwidth extended audio signal and providing 840 the bandwidth extended audio signal.

The bandwidth extension high-frequency signal comprises a high-frequency band. The high-frequency band of the bandwidth extension high-frequency signal is generated 810 based on a frequency shift of a frequency band of the input audio signal. The frequency shift is based on the offset frequency.

The high-frequency band of the bandwidth extension high-frequency signal is amplified 820 or attenuated by a factor equal to the value of the power density parameter or equal to the reciprocal value of the power density parameter.

Figure 9A:
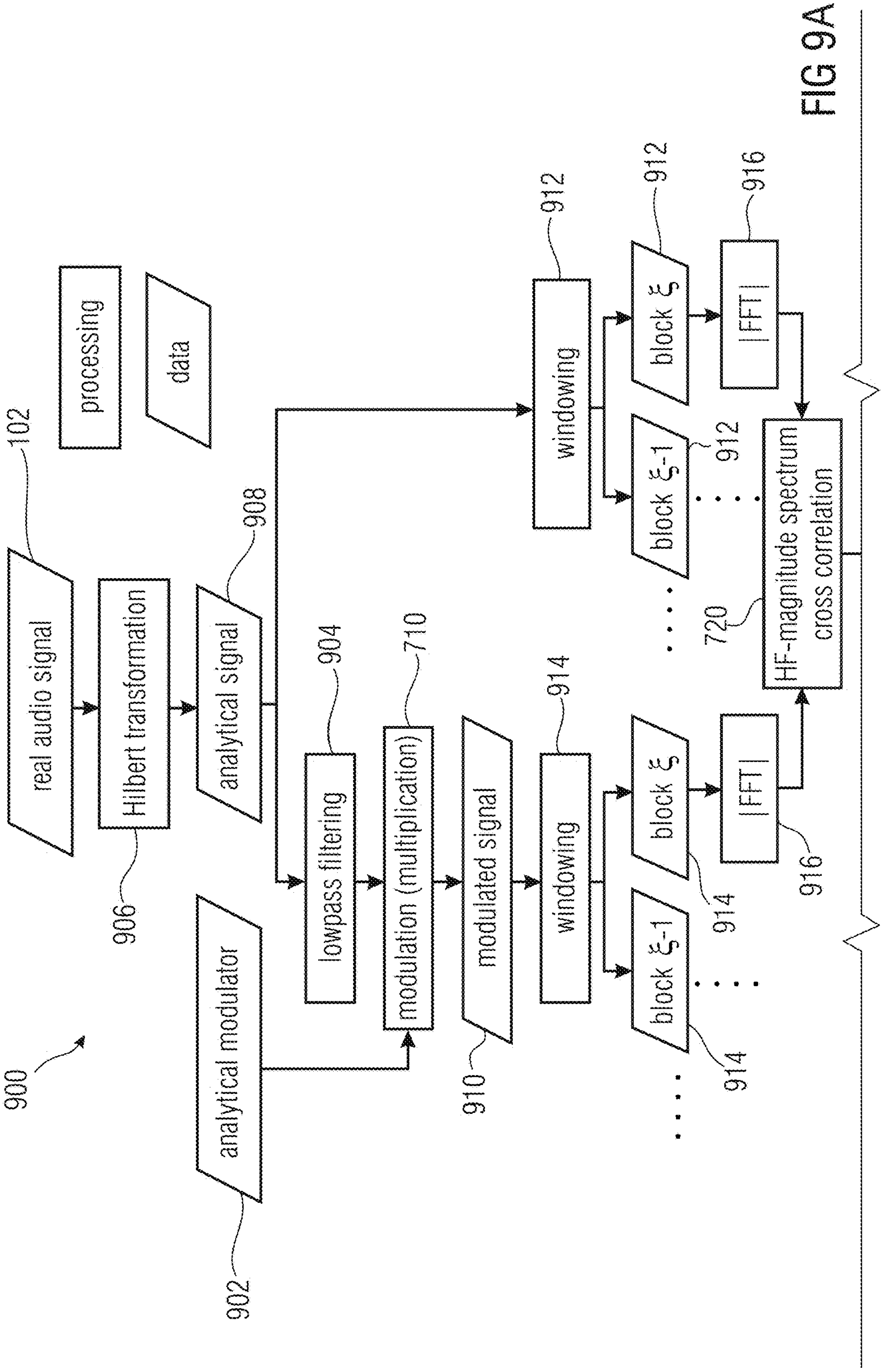
FIGS. 9A and 9B is a flow chart of a method for providing an output signal based on an input audio signal.
Figure 9B:
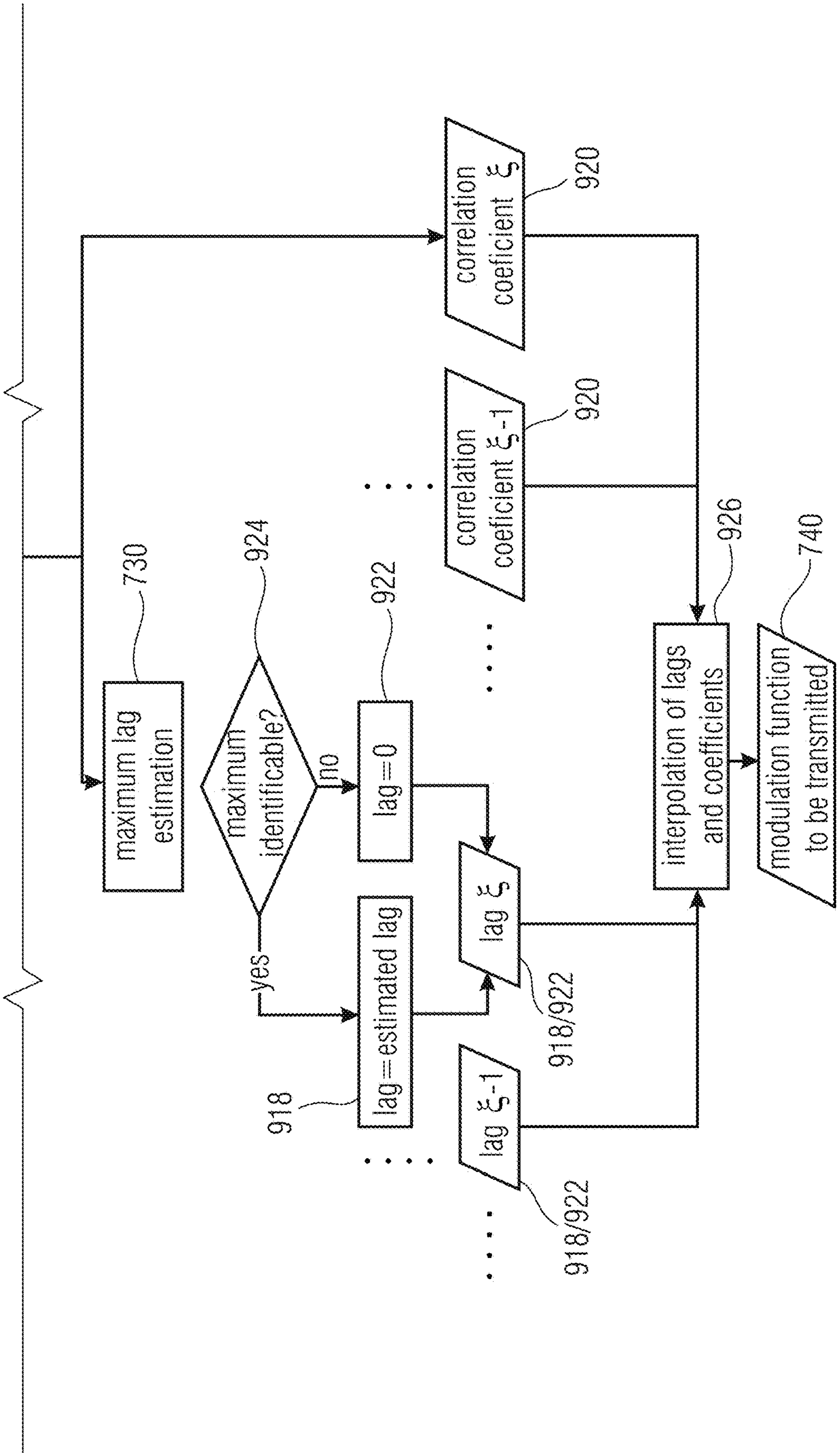

FIG. 9 shows a flowchart of a method 900 for providing and output signal based on an input audio signal according to an embodiment of the invention. It illustrates one possibility for the sequence of the algorithm in the encoder. This may also be formal mathematically described in the following. Real time signals may be indicated by Latin lower case letters, Hilbert transformed signals with corresponding Greek and Fourier transformed signals with Latin capital letters or alternatively Greek ones.

The input signal may be called f(n), the output signal o(n). $f_{HF_k}=f*filt_{BF_k}$; $1<k<k_{max}$ indicates the Fourier transformed, j indicated the imaginary number and the Hilbert transformation H(.) is defined as usual:

$$\varphi(m):=\mathcal{H}(f(n))=\mathcal{F}^{-1}(-j\cdot \mathrm{sgn}(\omega)\cdot F(j\omega))$$

with $$F(j\omega):=\mathcal{F}(f(n))$$

xOver may be the cutoff frequency of the core coder, $n\in N$ may indicate a time. $k_{max}>k\in N$ may indicate the k-th extension or patch. $\alpha_k$ describes a band edge of perceptual bands related to xOver, for example, according to the Bark or the ERB-scale. Alternatively, the $\alpha_k$ may, for example, increase linearly, i.e. $\alpha_{k+1}-\alpha_k\equiv$constant. The Hilbert transformation can also be calculated computationally efficient by filtering the signal with a modulated low-pass filter.

First, an analytical modulator function 902 with the modulation frequencies $\alpha_k$ and the resulting phase increments $$\gamma_k := \frac{\alpha_k}{Fs}$$

with the time increment $$\frac{1}{Fs}$$

(Fs indicates the sampling rate) may be generated. This may be mathematically described in the following formulas:

$$\mu_k(n) := e^{2\pi j\sum_{m=1}^{n}\gamma_k} = e^{2\pi j\gamma_k n}$$

-continued $$\mu(n) := \sum_{k=1}^{k_{max}} e^{2\pi j \sum_{m=1}^{n} \gamma_k} = \sum_{k=1}^{k_{max}} e^{2\pi j \gamma_k n}$$

The sum may only be replaced by n, if $\gamma_k$ is independent of n.

The input audio signal 102 or real audio signal f may be bandpass filtered to a bandwidth of $\alpha_{k+1}-\alpha_k$ which may be expressed by:

$$f_{LF}=f^*\text{filt}_{LF}$$

In this case, each patch will comprise the same bandwidth.

Alternatively, the input audio signal f 102 may be bandpass filtered to bandwidths of $\alpha_k$ with different bandwidths which can be described by:

$$f_{LF_k}=f^*\text{filt}_{LF_k}$$

Then the areas of the original signal may be determined which should be reconstructed by this method. These band limited regions may be indicated as:

$$f_{HF_k}f^*\text{filt}_{BF_k};\ 1<k<k_{max}$$

and are located in the intervals $(\alpha_k, \alpha_{k+1})$.

The modulation of the low-pass filtered input signals 904 may be done in the frequency domain or in the time domain.

In the frequency domain the input signals may be windowed first which may be described by:

$$f_\xi(n) = f\left(\xi\cdot\frac{NFFT}{2} + \text{mod}(n, NFFT) + 1\right)\cdot\text{win}(\text{mod}(n, NFFT) + 1)$$

wherein NFFT is the number of fast Fourier transformation bins (for example 512 bins), ξ is the window number and win(.) is a window function. The windows or time frames may comprise a temporarily overlap. For example, the formula given above describes a temporal overlap of half a window. Thus, N∈N blocks out of the original signal and with it connected as many amplitude spectra F$\xi(\omega)$ with $\xi\leq N$ as absolute values of the Fourier transformed $$\hat{\gamma}_k:=\lfloor\gamma_k\cdot\text{NFFT}\rfloor$$

describes the index of the band edge k in the Fourier transformed.

Then the signal is modulated in the frequency domain by shifting of the FFT-bins (fast Fourier transformation bins). The implicit Hilbert transformation is here not necessary, but it makes an equal formal description of the following steps possible:

$$\Psi_\xi(\omega+\hat{\gamma}_k):=F_\xi(\omega);\ \Phi_\xi(\omega):=F_\xi(\omega)$$

for ω≥0 and $$\Phi_\xi(\omega):=\Psi_\xi(\omega):\equiv 0\forall\omega<0$$

In the time domain a Hilbert transformation 906 of the input audio signal f 102 for generating an analytical signal 908 is done first.

$$\varphi:=f+j\mathcal{H}(f)$$

and $$\varphi_{LF_k}:=f_{LF_k}+j\mathcal{H}(f_{LF_k})$$

then the analytical signal $\phi_{LF_k}$ is single side band modulated 710 with a modulator μ(n) 902:

$$\psi(n) := \sum_{k=1}^{k_{max}} \varphi_{LF_k}(n)\cdot\mu_k(n)$$

or $$\psi(n) := \varphi_{LF}(n)\cdot\mu(n)$$

In this way, a bandwidth extension high-frequency signal which is also called modulated signal 910 may be generated.

Next, a windowing (also possible with overlap) of the input signal 912 and of the extended signal 914 and a Fourier transformation 916 are performed:

$$\varphi_\xi(n) = \varphi_{LF}\left(\xi\cdot\frac{NFFT}{2} + n\right)$$

and $$\psi_\xi(n) = \psi\left(\xi\cdot\frac{NFFT}{2} + \text{mod}(n, NFFT) + 1\right)\cdot\text{win}(\text{mod}(n, NFFT) + 1)$$

wherein an NFFT is once again the number of Fast Fourier transformation bins (for example 256, 512, 1024 bins or another number between $2^4$ and $2^{32}$), ξ is the window number and win(.) is a window function. Thus, N∈N blocks 914 are created out of the original signal and in connection with that as many amplitude spectra $\Phi_\xi(\omega)$, $\Psi_\xi(\omega)$ with $\xi\leq N$ as absolute values of the Fourier transformed 916.

$$\hat{\gamma}_k:=\lfloor\gamma_k\cdot\text{NFFT}\rfloor$$

may describe the index of the band edge k in the Fourier transformed.

The process in the time domain is shown in FIG. 9.

The next step is the calculation 720 of the cross correlation $R_{\xi,k}$ (the comparison parameter may be equal to the result of the cross correlation) of the partial amplitude spectra of the original and the extended signal which may be mathematically expressed by:

$$R_{\xi,k}(\nu) = \begin{cases} \dfrac{1}{\hat{\gamma}_{k+1} - \hat{\gamma}_k - \beta\cdot\nu + \delta} \displaystyle\sum_{\omega=\hat{\gamma}_k-\delta/2}^{\hat{\gamma}_{k+1}+\delta/2} |\Phi_\xi(\omega+\nu)|\cdot|\Psi_\xi(\omega)| & \nu\geq 0 \\ R_{\xi,k}(-\nu) & \nu<0 \end{cases}$$

with $$\Phi_\xi(\omega):\equiv\Psi_\xi(\omega):\equiv 0\forall\ \omega<0;\ \nu\leq\Lambda$$

δ may indicate the maximum lag (the maximum offset frequency) for which a cross correlation is calculated. If the cross correlation should be calculated with a bias, i.e. small lags and thus big overlaps should be advantageous, so β=0 should be selected. In contrast, if it should be compensated that fewer FFT-bins (Fast Fourier transformation bins) are overlapping for large lags than for small ones, β=1 should be chosen. In general, 0≤β∈P can be chosen arbitrarily. Alternatively or additionally, 2<δ∈ ℕ; mod(δ, 2)=0 can be chosen for selecting a region of the cross correlation which is a little larger than a patch. With this the region which is considered by the cross correlation may be extended by δ/2 at both spectral ends of the particular patch.

Based on these results of the cross correlation, a maximum of the cross correlation 730

$$m_{\xi,k} := \max_{v}(R_{\xi,k}(v))$$

and the lag $d_{\xi,k}$ of the maximum correlation $$R_{\xi,k}(d_{\xi,k}) = m_{\xi,k}$$

may be determined.

Additionally, the ratios 920 of the energies or powers in the patches may be determined by the power density spectra:

$$C_{\xi,k} := \sqrt{\frac{\sum_{\omega=\hat{\gamma}_k}^{\hat{\gamma}_{k+1}} |\Phi_\xi(\omega)|^2}{\sum_{\omega=\hat{\gamma}_k}^{\hat{\gamma}_{k+1}} |\Psi_\xi(\omega)|^2}}$$

If no clear maximum can be determined 924, the lag is put back to 0 (as shown at reference numeral 922). Otherwise the estimated lag 918 may the lag corresponding to the maximum cross correlation. For this, a suitable threshold criterion, $d_{\xi,k} > \tau$ with $\tau$ to be selected may be determined. Alternatively, the curvature or a spectral flatness (SFN) of the cross correlation $R_{\xi,k}$ may be observed, for example:

$$\frac{R''_{\xi,k}(v)}{\left(1 + (R'_{\xi,k}(v))^2\right)^{3/2}} > \tau;\ |v| \le \Lambda$$

or $$\frac{\frac{1}{2\Lambda+1}\sum_{v=1}^{2\Lambda+1} R_{\xi,k}(v)}{\sqrt[2\Lambda+1]{\prod_{v=1}^{2\Lambda+1} R_{\xi,k}(v)}} > \tau.$$

With $$R'_{\xi,k}(v) := \frac{\partial R_{\xi,k}(v)}{\partial v};\ R''_{\xi,k}(v) := \frac{\partial R'_{\xi,k}(v)}{\partial v}$$

The lags $d_{\xi,k}$ and the power density parameters may be interpolated 926 to obtain a value for each time step:

$$\zeta_k(n) := \text{interp}(c_{\xi,k});\ \lambda_k(n) = \text{interp}(d_{\xi,k})$$

Then, the modified, amplitude modulated and frequency shifted overall modulation function may be generated:

$$\tilde{\mu}(n) = \sum_{k=1}^{k_{max}} \zeta_k(n) e^{2\pi j \sum_{m=1}^{n} (\gamma_k(m) + \lambda_k(m))}$$

This overall modulation function or the parameters of the overall modulation function may be provided 740 with the output signal for storage or transmission.

Additionally, further parameters for noise correction and/or tonality correction may be determined.

The modulation at the decoder may be done by:

$$\tilde{\psi}(n) := \varphi_{LF}(n) \cdot \tilde{\mu}(n)$$

and addition of the k partial modulations (if there is more than one patch). For this the overall modulation function $\mu_k(n)$ or $\mu(n)$ or the parameters $\zeta_k(n)$ and $\lambda_k(n)$ or $c_{\xi,k}$ and of the overall modulation function may be suitable coded, for example, by quantization. Optionally, the sampling rate may be reduced and a hysteresis may be introduced.

The calculation of the lags can be omitted, if no tonal signal is there, for example at silence, transients or noise. In these cases the lag may be set to zero.

Figure 10:
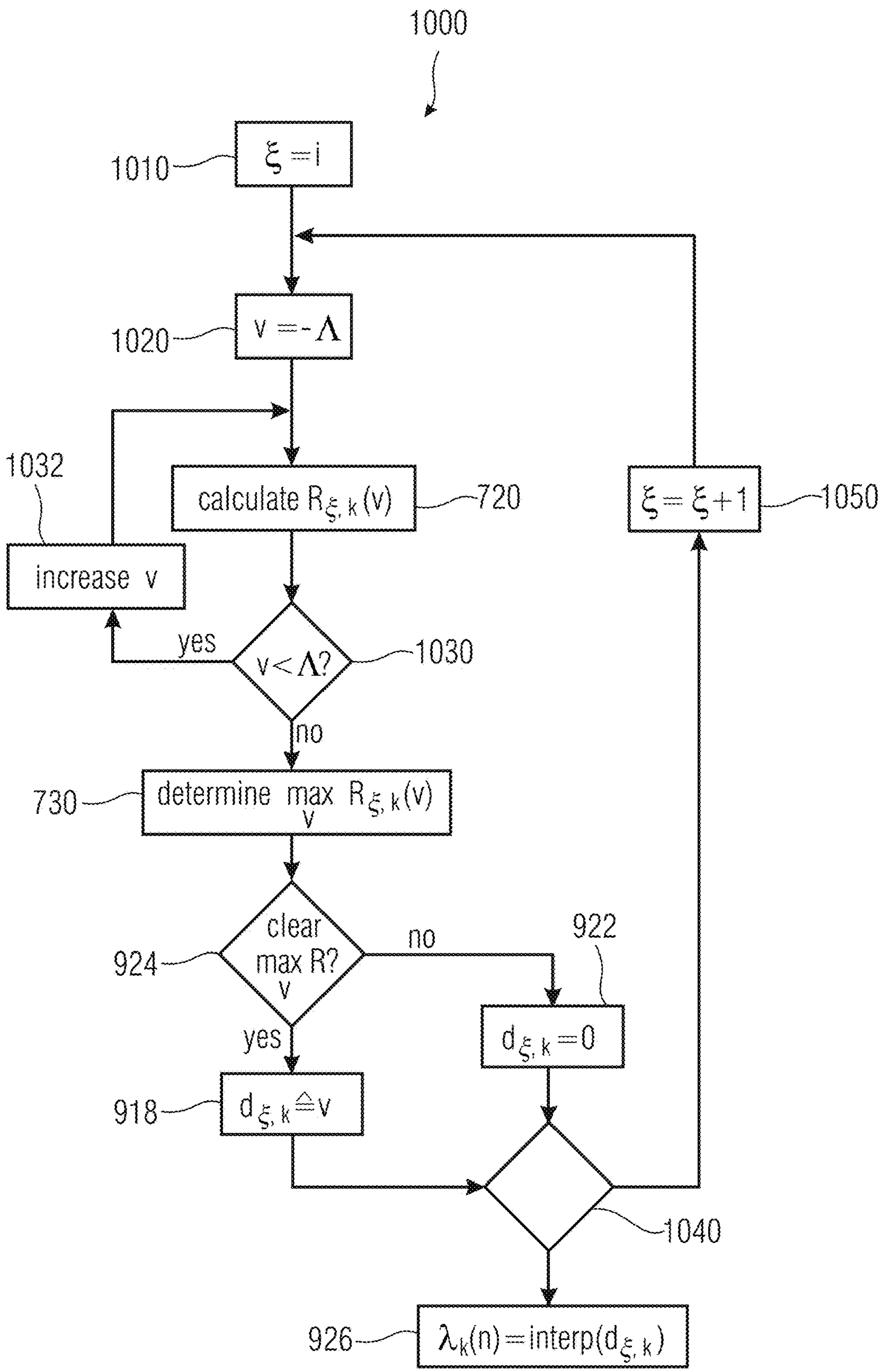
FIG. 10 is a flow chart of a method for calculating a comparison parameter.

FIG. 10 shows in more detail an example 1000 for determining the lag.

For a time frame or window $\xi = i$ 1010 the lag $v$ is set to minus $\lambda$ as start value. Then the cross correlation $R_{\xi,k}(v)$ is calculated 720. If $v$ is smaller than $\Lambda$ 1030, then $v$ is increased 1032 and the next comparison parameter in terms of the cross correlation is calculated 720. If $v$ is equal or larger than $\Lambda$ 1030, then the lag corresponding to the maximum calculated cross correlation may be determined 730. If the maximum is clearly identifiable 924 the determined lag is used as parameter $d_{\xi,k}$ 918. Otherwise, the lag is set to 0 and used as parameter $d_{\xi,k}=0$ 922.

Then the whole process is repeated 1040 for the next time frame $\xi=\xi+1$ 1050. The determined lags may be interpolated 926 to obtain a parameter for each time step N.

The calculation of the plurality of comparison parameters, for example, the result of the cross correlation, may be done also in parallel if a plurality of comparators are used. Also, the processing of different time frames may be done in parallel, if the hardware that may be used is available several times. The loop for calculating the cross correlation may also start at $+\Lambda$ and may be decreased each loop until $v \le \Lambda$.

Figure 11A:
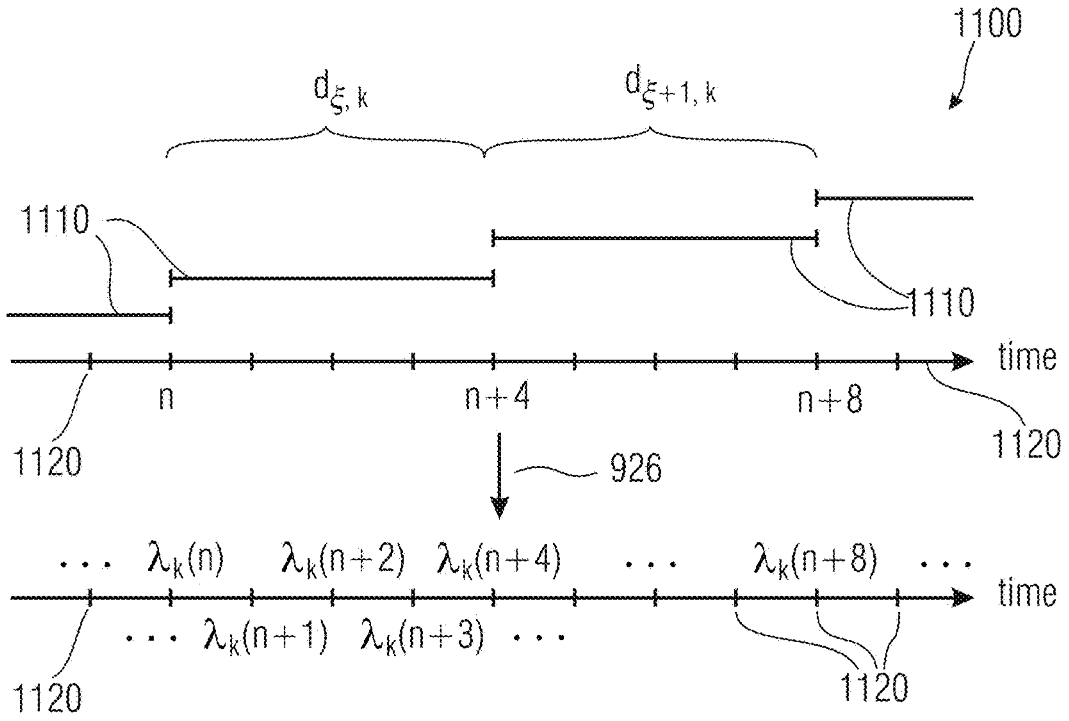
FIGS. 11A and 11B is a schematic illustration of an interpolation of the offset frequency.

FIG. 11 shows a schematic illustration of the interpolation 926 of the offset frequencies of different time frames, time intervals or windows. FIG. 11A shows the interpolation 1100, if the time frames do not overlap. A lag $d_{\xi,k}$ is determined for a whole time frame 1110. The easiest way for interpolating a parameter for each time step 1120 may be realized by setting the parameters of all time steps 1120 of a time frame 1110 equal to the corresponding lag $d_{\xi,k}$. At the edges of a time frame the lag of the previous or the following time frame may be selected. For example, the parameters $\lambda_k(n)$ to $\lambda_k(n+3)$ are equal to $d_{\xi,k}$ and the parameters $\lambda_k(n+4)$ to $\lambda_k(n+7)$ are equal to $d_{\xi+1,k}$.

Alternatively, the lags of the time frames 1110 may be interpolated linearly between the time frames. For example:

$$\lambda_k(n) = \frac{d_{\xi,k} + d_{\xi-1,k}}{2}$$

$$\lambda_k(n+1) = \frac{3 \cdot d_{\xi,k} + d_{\xi-1,k}}{4}$$

$$\lambda_k(n+2) = d_{\xi,k}$$

$$\lambda_k(n+3) = \frac{3 \cdot d_{\xi,k} + d_{\xi+1,k}}{4}$$

$$\lambda_k(n+4) = \frac{d_{\xi,k} + d_{\xi+1,k}}{2}$$

Figure 11B:
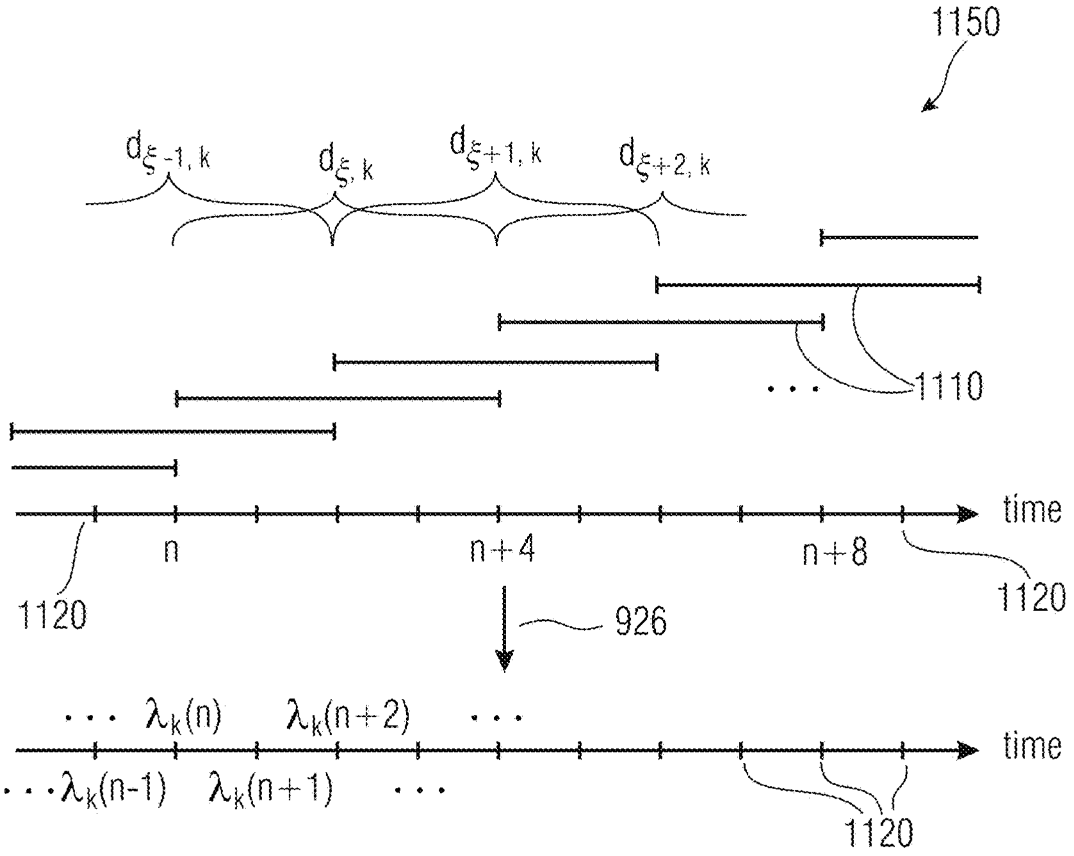

Fittingly, FIG. 11B shows an example 1150 for overlapping time frames 1110. In this case, one time step 1120 is associated to more than one time frame 1110. Therefore, more than one determined lag may be associated with one time step 1120. So, the determined lags may be interpolated 926 to obtain one parameter for each time step 1120. For example, the determined lags corresponding to one time step 1120 may be linearly interpolated. For example, a possible interpolation may be:

$$\lambda_k(n) = d_{\xi-1,k}$$

-continued $$\lambda_k(n+1) = \frac{d_{\xi-1,k} + d_{\xi,k}}{2}$$

$$\lambda_k(n+2) = d_{\xi,k}$$

$$\lambda_k(n+3) = \frac{d_{\xi,k} + d_{\xi+1,k}}{2}$$

Alternatively, the interpolation may also be done, for example, by a median filtering.

The interpolation may be done by an interpolation means. The interpolation means may be part of the parameter extraction unit or the output interface or may be an separate unit.

At the decoder side the bandwidth extension may be done by:

$$\tilde{\psi}(n) := \varphi_{LF}(n) \cdot \tilde{\mu}(n)$$

After decoding of $\tilde{\mu}$(n) and $\varphi_{LF}$(N) as output of the core coder. Additionally, $\psi$(n) may be adapted with the previously from the original signal obtained parameters for tonality and/or noise level.

The calculation of the overall modulation function at the decoder is done according to one of the both following formulas:

$$\psi(n) = \sum_{k=1}^{k_{max}} \varphi_{LF_k}(n) \cdot \mu_k(n) + \text{noise}(n)$$

and $$\psi(n) = \varphi_{LF}(n) \cdot \mu(n) + \text{noise}(n)$$

The imaginary part of the signal may be ignored:

$$o(n) = \text{Re}(\psi(n))$$

Then, as mentioned before, a tonality correction, for example, by inverse filtering, may follow.

Figure 12:
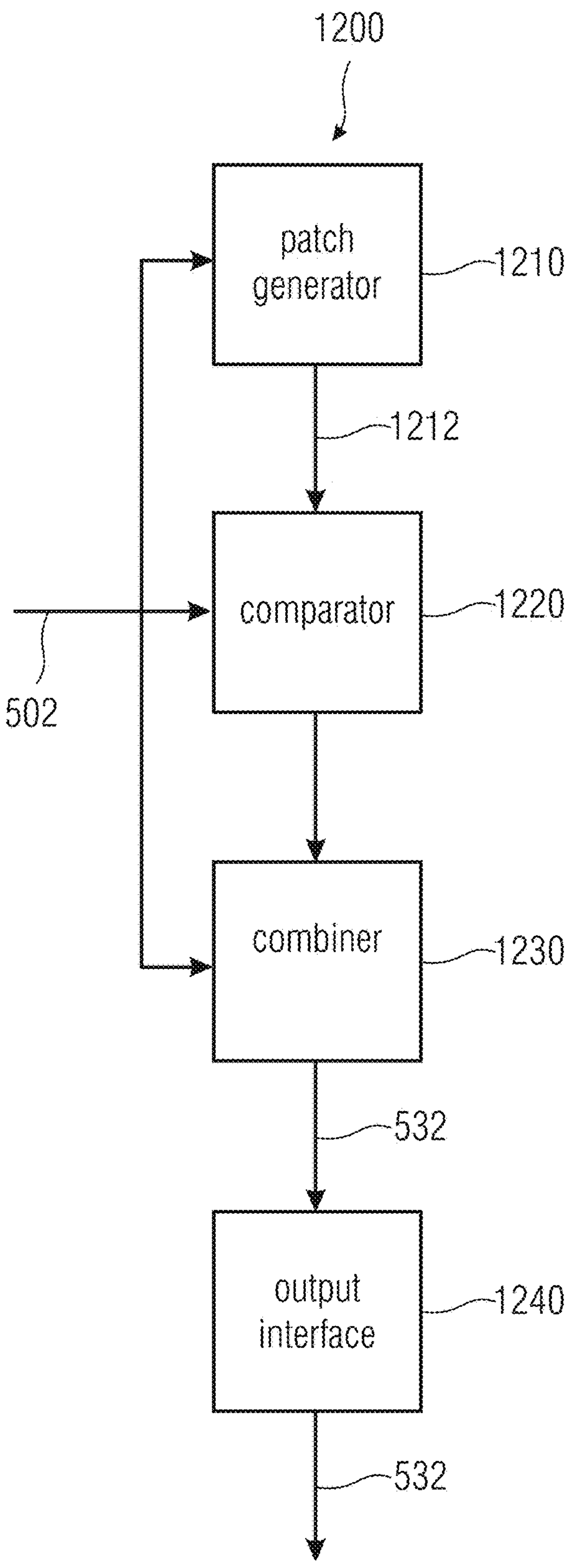
FIG. 12 is a block diagram of a bandwidth extension decoder.

FIG. 12 shows a block diagram of a bandwidth extension decoder 1200 for providing a bandwidth extended audio signal 532 based on an input audio signal 502 according to an embodiment of the invention. The bandwidth extension decoder 1200 comprises a patch generator 1210, a comparator 1220, a combiner 1230 and an output interface 1240. The patch generator 1210 is connected to the comparator 1220, the comparator 1220 is connected to the combiner 1230 and the combiner 1230 is connected to the output interface 1240.

The patch generator 1210 generates at least one bandwidth extension high-frequency signal 1212 comprising a high-frequency band based on the input audio signal 502, wherein a lower cutoff frequency of the high-frequency band of a bandwidth extension high-frequency signal 1212 is lower than an upper cutoff frequency of the input audio signal 502. Different bandwidth extension high-frequency signals 1212 comprise different frequencies within their high-frequency bands, if different bandwidth extension high-frequency signals 1212 are generated.

The comparator 1220 calculates a plurality of comparison parameters. A comparison parameter is calculated based on a comparison of the input audio signal 502 and a generated bandwidth extension high-frequency signal 1212. Each comparison parameter of the plurality of comparison parameters is calculated based on a different offset frequency between the input audio signal 502 and a generated bandwidth extension high-frequency signal 1212. Further, the comparator determines a comparison parameter from the plurality of comparison parameters, wherein the determined comparison parameter fulfils a predefined criterion.

A combiner 1230 combines the input audio signal 502 and the bandwidth extension high-frequency signal 1212 to obtain the bandwidth extended audio signal 532, wherein the bandwidth extension high-frequency signal 1212 is based on an offset frequency corresponding to the determined comparison parameter.

The output interface 1240 provides the bandwidth extended audio signal 532.

In comparison to the decoder shown in FIG. 5 the described decoder 1200 determines the offset frequency by itself. Therefore, it is not necessary to receive this parameter with the input audio signal 502. In this way the bit rate for transmission or storage of audio signals may be further reduced.

As it was described for FIG. 1, the patch generator 1210 may generate a plurality of bandwidth extension high-frequency signals with different offset frequencies or only one bandwidth extension high-frequency signal which is shifted by different offset frequencies. Again, also a combination of these two possibilities may be used.

Figure 13:
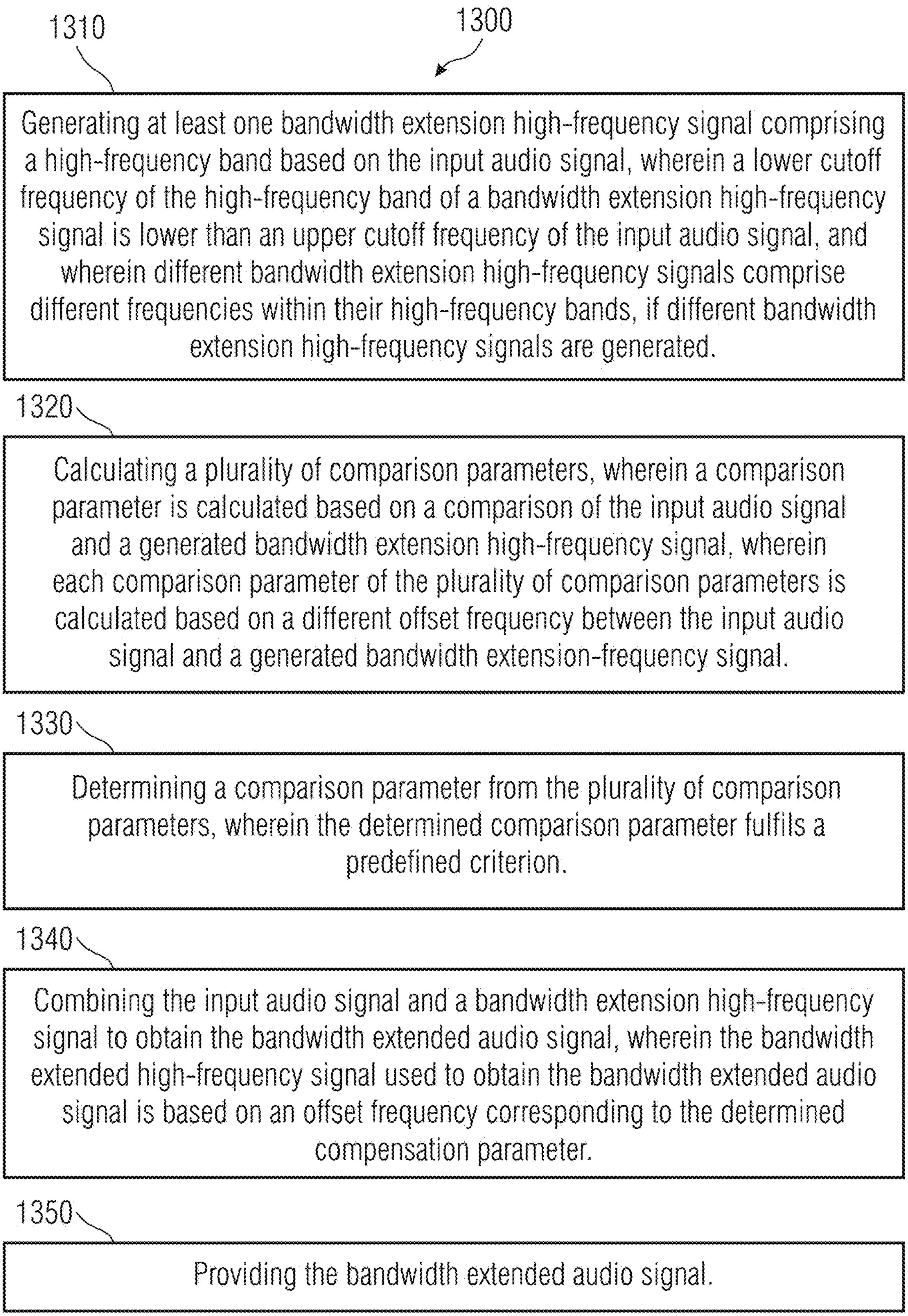
FIG. 13 is a flow chart of a method for providing a bandwidth extended audio signal.

FIG. 13 shows a flowchart of a method 1300 for providing a bandwidth extended audio signal according to an embodiment of the invention. The method 1300 comprises generating 1310 at least one bandwidth extension high-frequency signal, calculating 1320 a plurality of comparison parameters, determining 1330 a comparison parameter from the plurality of comparison parameters, combining 1340 the input audio signal and a bandwidth extension high-frequency signal and providing 1350 the bandwidth extended audio signal.

A bandwidth extended high-frequency signal comprises a high-frequency band based on the input audio signal. A lower cutoff frequency of the high-frequency band of a bandwidth extended high-frequency signal is lower than an upper cutoff frequency of the input audio signal. Different bandwidth extension high-frequency signals comprise different frequencies within their high-frequency bands, if different bandwidth extension high-frequency signals are generated.

A comparison parameter is calculated based on the comparison of the input audio signal and the generated bandwidth extension high-frequency signal. Each comparison parameter of the plurality of comparison parameters is calculated based on a different offset frequency between the input audio signal and the generated bandwidth extension high-frequency signal.

The determined comparison parameter fulfils a predefined criterion.

The bandwidth extension high-frequency signal which is combined with the input audio signal to obtain the bandwidth audio signal is based on an offset frequency corresponding to the determined comparison parameter.

Figure 14:
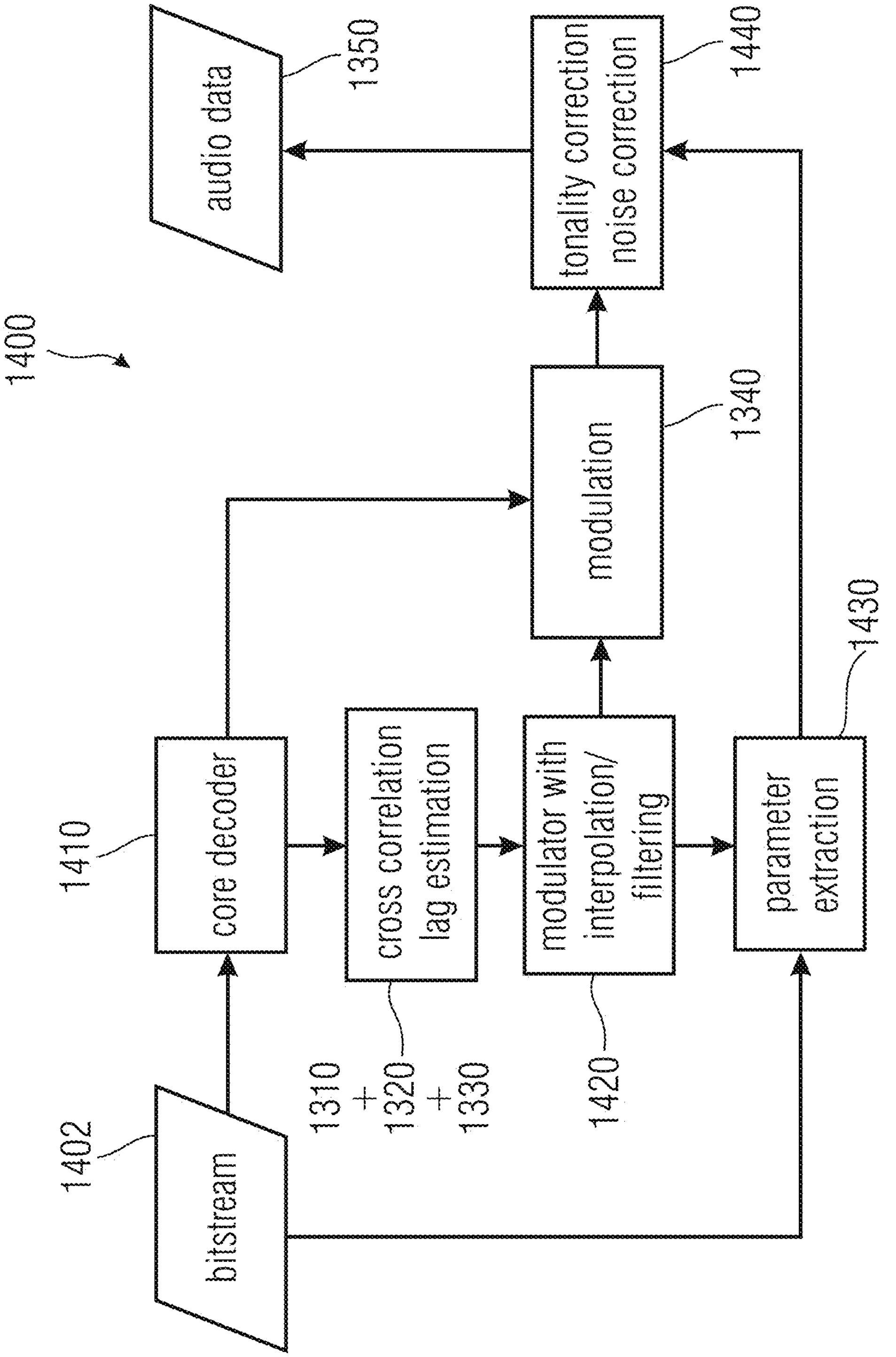
FIG. 14 is a block diagram of a method for providing a bandwidth extended audio signal.

FIG. 14 shows a flowchart of a method 1400 for providing a bandwidth extended audio signal according to an embodiment of the invention.

After receiving 1402 a bit stream comprising the input audio signal a core decoder decodes 1410 the input audio signal. Based on the input audio signal a bandwidth extension high-frequency signal is generated 1310 and the plurality of comparison parameters in terms of a cross correlation between the input audio signal and a generated bandwidth extension high-frequency signal with different offset frequencies are calculated 1320. Then, the comparison parameter fulfilling the predefined criterion is determined 1330 which is also called lag estimation.

Based on the offset frequency corresponding to the determined comparison parameter a modulator may modulate 1420 the input audio signal. Additionally, a parameter may be extracted 1430 from the received bit stream 1402 to adapt, for example, the power density of the modulated signal. The modulated signal is then combined 1340 with the input audio signal. Additionally, the tonality and the noise of the bandwidth extended audio signal may be corrected 1440. This may also be done before the combination with the input audio signal. Then the audio data in terms of the bandwidth extended audio signal is provided 1350, for example, for acoustic reproduction.

In this way, the calculation of the time variable modulation is done at the decoder side.

Alternatively to the modulator modulating 1420 the input audio signal to generate a patch, for example, the already previously generated bandwidth extension high-frequency signal may be used or the patch generator may generate a bandwidth extension high-frequency signal (patch) based on the offset frequency corresponding to the determined comparison parameter.

In other words, if low data rate is more important than a low complexity of the decoder side, the determination of the frequency modulation of the modulators may also be done at the decoder side. For this the algorithm shown in FIG. 9 may be executed at the decoder with only some changes. Since the original signal is not available for the calculation of the cross correlation at the decoder, the correlations may be calculated between the original signal (input audio signal) and a shifted original signal (input audio signal) within an overlapping range. For example, the signal may be shifted between zero and $\alpha_k k$, for example, $\alpha_k$ divided by 2, $\alpha_k$ divided by 3, or $\alpha_k$ divided by 4. $\alpha_k$ indicates again the k-th band edge, for example, $\alpha_1$ indicates the crossover frequency of the core coder.

For example, this may happen in the same way at the encoder as at the decoder. At the encoder the parameters for spectral forming, noise correction and/or tonality correction may be extracted and transmitted to the decoder.

Figure 15:
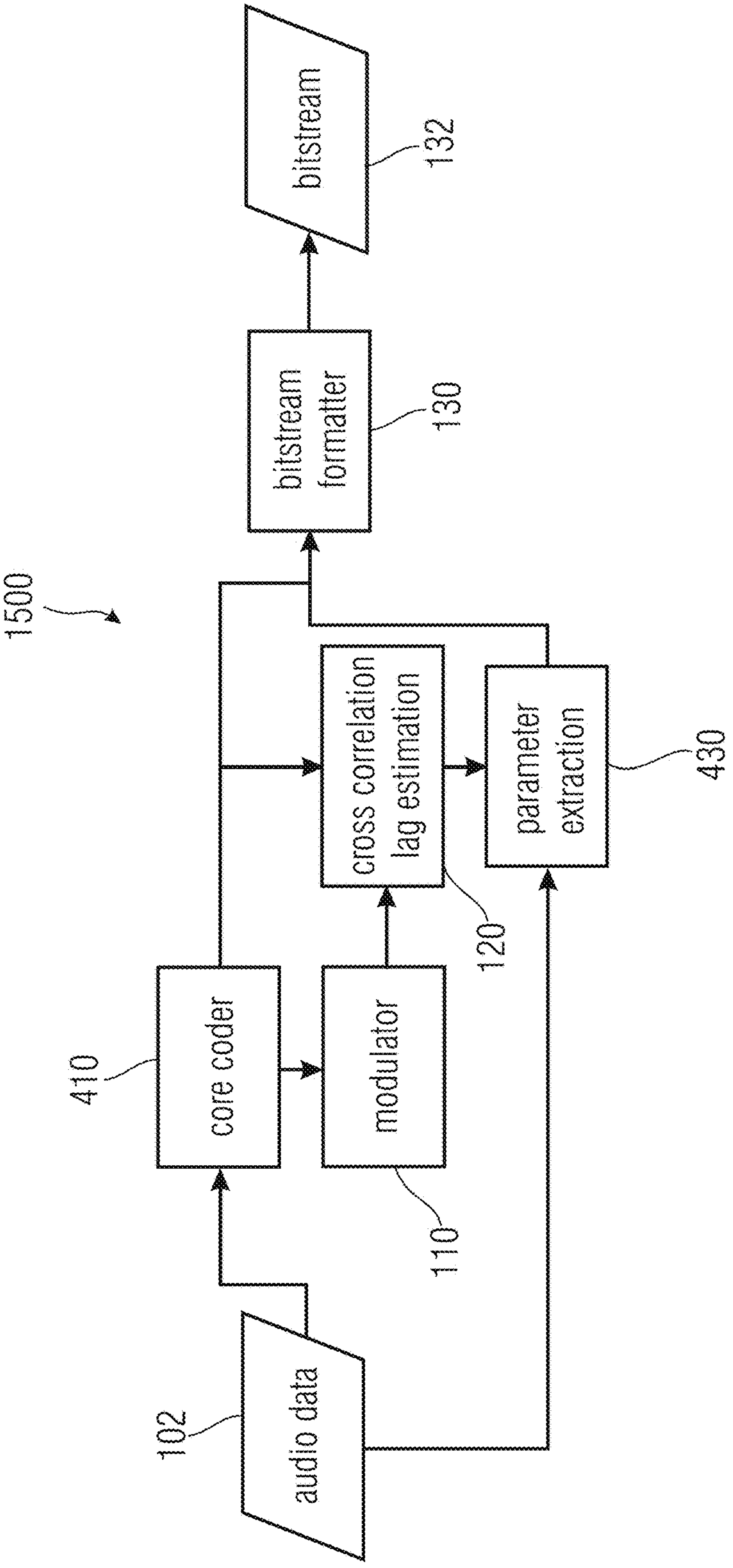
FIG. 15 is a block diagram of an bandwidth extension encoder.

Fittingly, FIG. 15 shows a block diagram of an bandwidth extension encoder 1500 for providing an output signal using an input audio signal according to an embodiment of the invention. The encoder 1500 corresponds to the encoder shown in FIG. 4. However, the encoder 1500 does not provide the output signal 132 with a parameter indication based on the offset frequency itself. It may only determine a power density parameter and optional parameters for tonality correction and noise correction and includes a parameter indication of these parameters to the output signal 132. However, the power density parameter (and also the other parameters, if they are determined) is determined based on the offset frequency corresponding to the determined comparison parameter.

For example, the power density parameter may indicate a ratio between the input audio signal 102 and the bandwidth extension high-frequency signal with an offset frequency corresponding to the determined comparison parameter. Therefore, the parameter indication which is related to the power density parameter and optional to the parameters for tonality correction and/or noise correction is based on the offset frequency corresponding to the determined comparison parameter.

A further difference between the encoder 1500 and the encoder shown in FIG. 4 is that the patch generator 110 generates a bandwidth extension high-frequency signal in the same way the patch generator of the decoder 1400 does it. In this way the encoder 1500 and a decoder may obtain the same offset frequencies and therefore the parameters extracted by the encoder 1500 are valid for the patches generated by the decoder.

Some embodiments according to the invention relate to a device and a method for bandwidth extension of audio signals in the time domain using time variable modulators. In other words. A patch may be generated with varying cutoff frequency, for example, for each time step, each time frame, a part of a time frame or for groups of time frames.

The described method for extension of the bandwidth of an audio signal can be used at the encoder side and the decoder side as well as only at the decoder side. In contrast to known methods, the described new method may carry out a so-called harmonic extension of the bandwidth without the need of exact information about the fundamental frequency of the audio signal. Further, in contrast to so-called harmonic bandwidth extensions as, for example, shown by the US provisional patent application "F. Nagel, S. Disch: "Apparatus and method of harmonic bandwidth extension in audio signals"" with the application number U.S. 61/025,129 which are done by means of phase vocoders, the spectrum may not be spread and, therefore, also the density may not be changed. To ensure the harmony, correlations between the extended and the base band are exploited. This correlation can be calculated at the encoder as well as at the decoder, depending on the demand for computing and memory complexity and data rate.

For example, the bandwidth extension itself may be done by using an amplitude modulation (AM) and a frequency shift by means of a single side band modulation (SSB) with a plurality of slow, single adaptive, time variable carriers. A following post-processing in accordance with additional parameters may try to approximate the spectral envelope and the noise level as well as other properties of the original signals.

The new method for transformation of signals may avoid the problems which appear due to a simply copy or mirror operation by a harmonic correct continuation of the spectrum by means of a time variable cutoff frequency XOver between the low frequency (LF) and high-frequency (HF) region as well as between the following high-frequency regions, the so-called patches. These cutoff frequencies are chosen so that the generated patches fit an existing harmonic raster as it was existent in the original as good as possible.

Figure 16B:
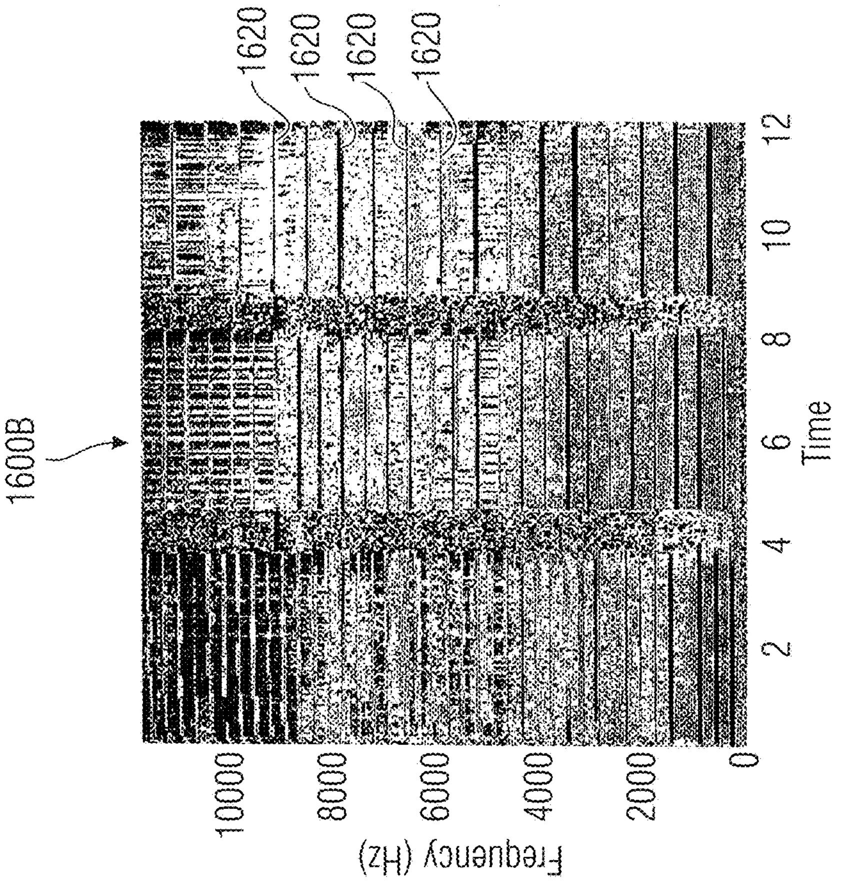
FIG. 16B is a spectrogram of the original audio signal of three tones.
Figure 16A:
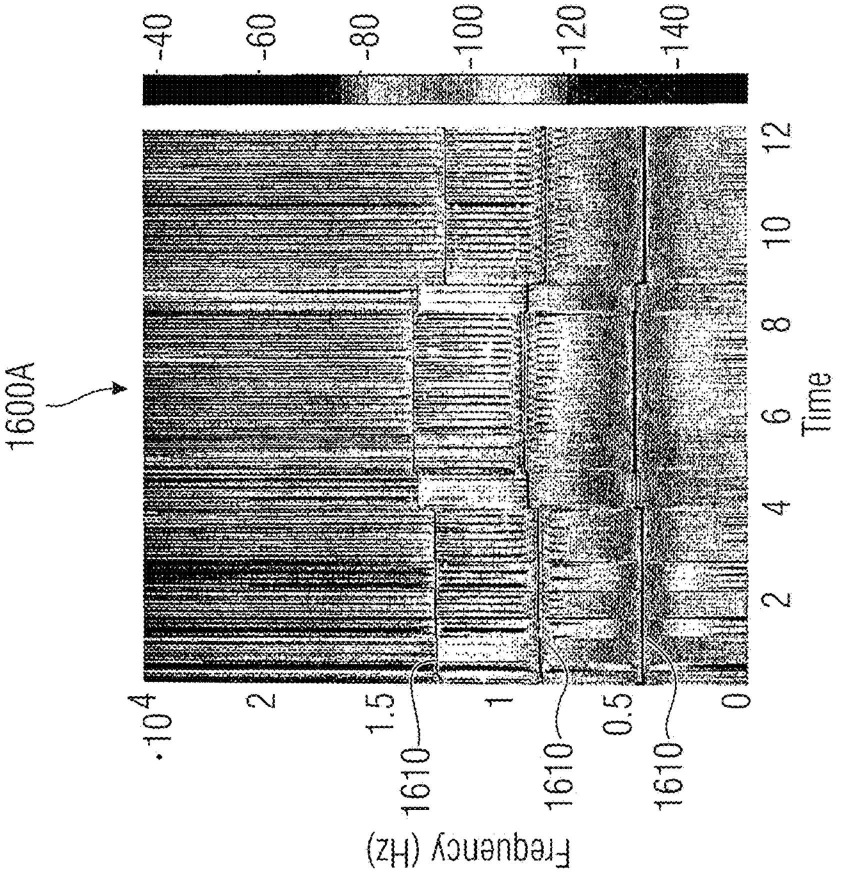
FIG. 16A is a spectrogram of three tones using variable crossover frequency.
Figure 18B:
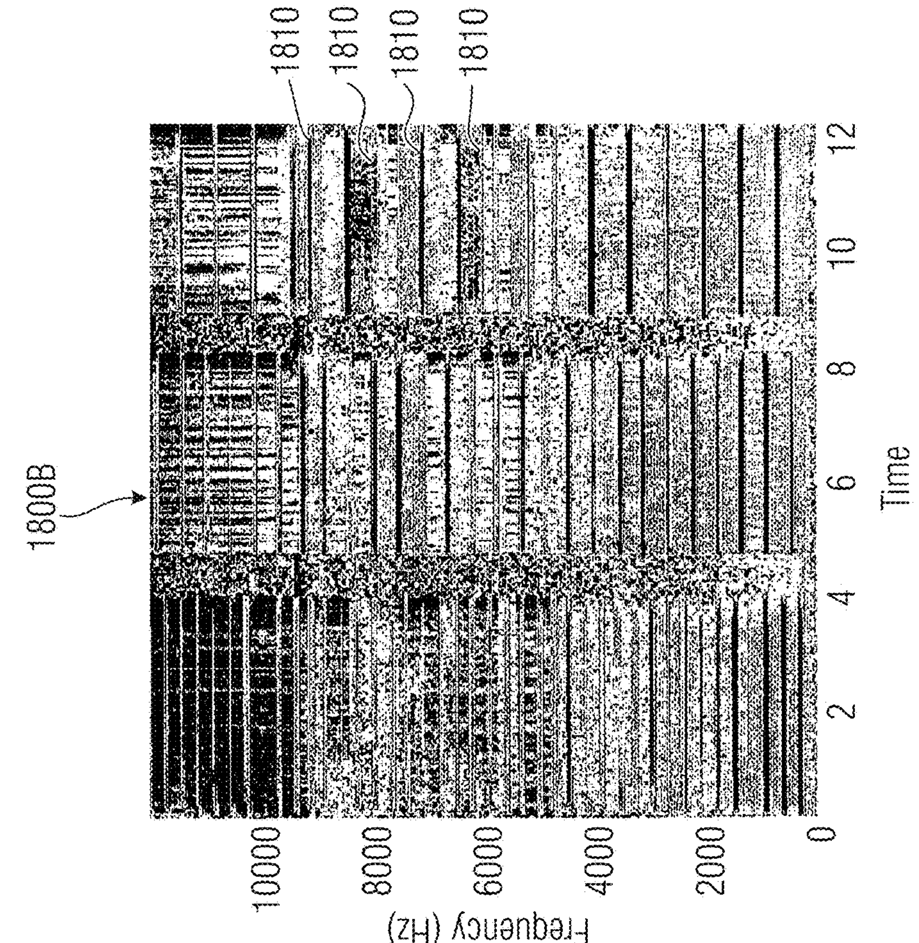
FIG. 18B is a spectrogram of the original audio signal of three tones.
Figure 18A:
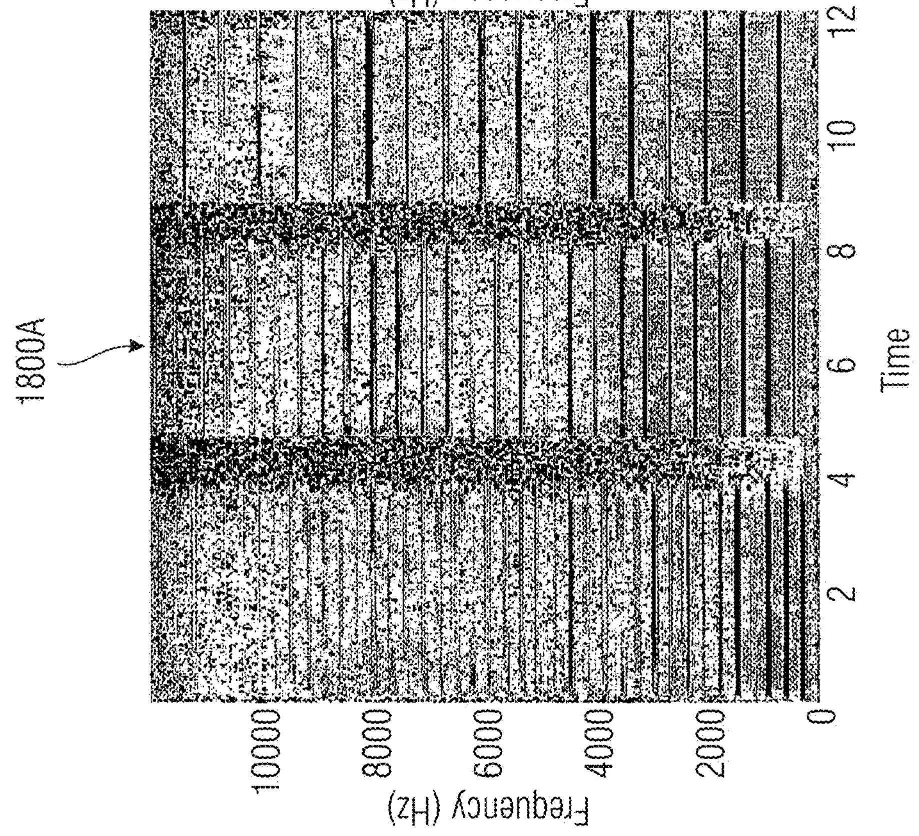
FIG. 18A is a spectrogram of three tones using a known bandwidth extension method.

FIG. 16 shows a modulator with 3 time variable amplitudes and cutoff frequencies by which 3 patches can be generated by single side band modulation of the base bands. FIG. 16A shows a diagram 1600a of the spectrum of the bandwidth extended signal using time variable cutoff frequencies 1610. FIG. 16B illustrates a diagram 1600b of the spectrum of the audio signal of the three tones. In comparison to the spectrogram depicted in FIG. 18B the lines 1620 are significantly less smeared.

Figure 17:
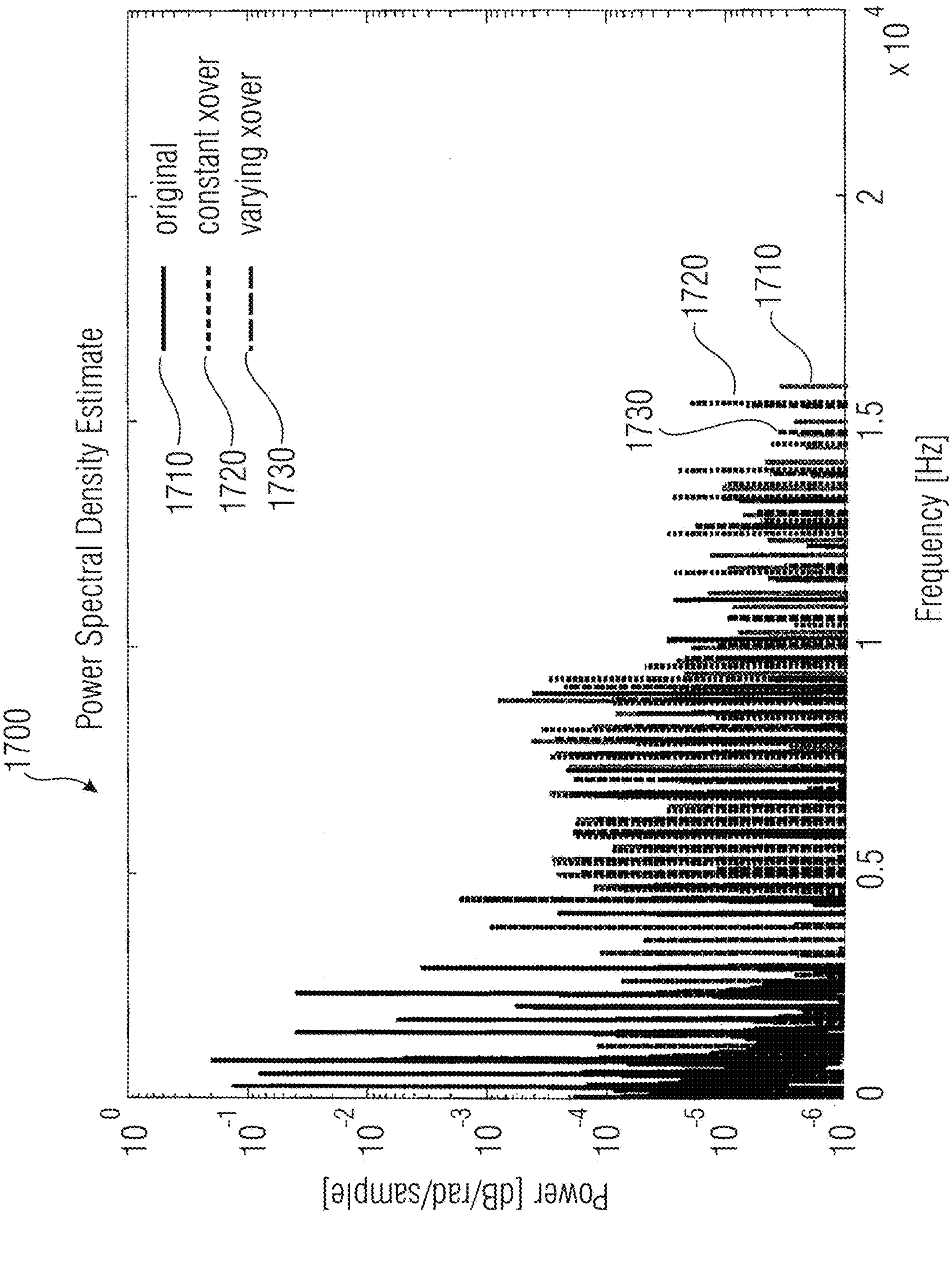
FIG. 17 is a power spectrum diagram of an original audio signal, a bandwidth extended audio signal using constant crossover frequency and a bandwidth extended audio signal using variable crossover frequency.

FIG. 17 illustrates the effect by means of a diagram 1700 of the period. The power density spectrum of the third tones of the audio signal are shown as original 1710, with a constant cutoff frequency 1720 and with a variable cutoff frequency 1730. In contrast to using the constant cutoff frequency 1720, the harmonic structure remains by using the variable cutoff frequency 1730.

By the harmonic continuation of the spectrum, problems at the transition points between both, the base band (core coder) and the extended band, and between succeeding patches may be avoided. Without a $F_0$-estimation as requirement for the function of the system, arbitrary signals may be harmonic continued, without the existence of audible artefacts, neither by violating the harmony nor by transient sound events.

Some embodiments according to the invention relate to a method suitable for all audio applications, where the full bandwidth is not available. For example, for the broadcast of audio contents as, for example, with digital radio, internet stream or at audio communication applications, the described method may be used.

Further embodiments according to the invention relate to a bandwidth extension decoder for providing a bandwidth extended audio signal based on an input audio signal and a parameter signal, wherein the parameter signal comprises an indication of an offset frequency and an indication of a power density parameter. The bandwidth extension decoder comprises a patch generator, a combiner, and an output interface. The patch generator is configured to generate a bandwidth extension high-frequency signal comprising a high-frequency band, wherein the high-frequency band of the bandwidth extension high-frequency signal is generated based on a frequency shift of a frequency band of the input audio signal, wherein the frequency shift is based on the offset frequency, and wherein the patch generator is configured to amplify or attenuate the high-frequency band of the bandwidth extension high-frequency signal by a factor equal to the value of the power density parameter or equal to the reciprocal value of the power density parameter. The combiner is configured to combine the bandwidth extension high-frequency signal and the input audio signal to obtain the bandwidth extended audio signal. The output interface is configured to provide the bandwidth extended audio signal.

Some further embodiments according to the invention relate to a bandwidth extension decoder as described before, wherein the patch generator is configured to amplify or attenuate the high-frequency band of the bandwidth extension high-frequency signal by a factor equal to the value of a power density parameter or equal to the reciprocal value of the power density parameter, wherein an indication of the power density parameter is contained by the input audio signal.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A bandwidth extension audio decoder, comprising:

a core decoder configured to decode a received bit stream comprising an input audio signal and a parameter signal, wherein the parameter signal comprises an indication of an offset frequency or an indication of a power density parameter;

a patch generator configured to generate a bandwidth extension high-frequency signal comprising a high-frequency band using the input audio signal and the parameter signal comprising the indication of the offset frequency or the indication of the power density parameter;

a parameter extraction unit configured for separating the parameter signal from the received bit stream and for providing a separated parameter signal to the patch generator;

a combiner configured to combine the bandwidth extension high-frequency signal and the input audio signal to acquire a bandwidth extended audio signal; and an output interface configured to output the bandwidth extended audio signal;

wherein the core decoder is connected to the patch generator and the combiner, wherein the parameter extraction unit is connected to the patch generator and to the output interface, wherein the patch generator is connected to the combiner, and wherein the combiner is connected to the output interface, and wherein the core decoder is configured to provide the input audio signal to the patch generator and the combiner.

2. The bandwidth extension audio decoder according to claim 1, wherein the combiner is configured to ignore a part of the high-frequency band of the bandwidth extension high-frequency signal, wherein an ignored part of the high-frequency band of the bandwidth extension high-frequency signal comprises frequencies lower than an upper cutoff frequency of the input audio signal.

3. The bandwidth extension audio decoder according to claim 2, wherein the core decoder is configured to generate the input audio signal with a constant upper cutoff frequency, and wherein the patch generator is configured to generate the high-frequency band of the bandwidth extension high-frequency signal by shifting a frequency band of the input audio signal by a frequency equal to the upper cutoff frequency of the input audio signal plus the offset frequency.

4. The bandwidth extension audio decoder according to claim 1, wherein the patch generator is configured to generate the bandwidth extension high-frequency signal in the time domain.

5. The bandwidth extension audio decoder according to claim 4, wherein the patch generator is configured to generate the bandwidth extension high-frequency signal based on a single side band modulation.

6. The bandwidth extension audio decoder according to claim 1, comprising an interpolator, wherein a time frame comprises a plurality of time steps, wherein each time frame comprises a corresponding offset frequency, wherein the interpolator is configured to interpolate an offset frequency of a time frame or a plurality of offset frequencies of different time frames for each time step of a time frame to acquire an interpolated offset frequency for each time step.

7. The bandwidth extension audio decoder according to claim 1, wherein the power density parameter indicates a ratio of the high-frequency band of the bandwidth extension high-frequency signal with the offset frequency and a corresponding frequency band of the input audio signal.

8. The bandwidth extension audio decoder according to claim 7, wherein the ratio relates to a power density ratio, a power ratio, or another ratio of a quantity related to the power density of a frequency band.

9. The bandwidth extension audio decoder according to claim 1, wherein the indication of the offset frequency comprises the offset frequency itself, a quantized offset frequency or another quantity based on the offset frequency.

10. The bandwidth extension audio decoder according to claim 1, wherein the low frequency band of the input audio signal is spread and shifted to generate a bandwidth extension high frequency signal.

11. The bandwidth extension audio decoder according to claim 1, wherein the patch generator is configured to generate the bandwidth extension high-frequency signal by shifting the frequency band of the input audio signal by a constant frequency plus the offset frequency.

12. The bandwidth extension audio decoder according to claim 1, wherein the patch generator is configured to generate the bandwidth extension high-frequency signal in a frequency domain.

13. The bandwidth extension audio decoder according to claim 1, wherein the output interface is configured to amplify the bandwidth extended audio signal before providing the same.

14. The bandwidth extension audio decoder according to claim 1, wherein the input audio signal comprises an upper cutoff frequency equal to a crossover frequency of the core decoder, or wherein the crossover frequency is constant or is variable over time.

15. The bandwidth extension audio decoder according to claim 1, wherein the parameter extraction unit is configured to provide the parameter signal or an extracted noise and/or tonality parameter to the output interface.

16. The bandwidth extension audio decoder according to claim 1, wherein the patch generator is configured to generate the high-frequency band of the bandwidth extension high-frequency signal based on a frequency shift of a frequency band of the input audio signal, wherein the frequency shift is based on the offset frequency, or wherein the patch generator is configured to amplify or attenuate the high-frequency band of the bandwidth extension high-frequency signal by a factor equal to the value of the power density parameter or equal to the reciprocal value of the power density parameter, respectively.

17. A method for performing a bandwidth extension audio decoding, the method comprising:

core decoding a received bit stream comprising an input audio signal and a parameter signal, wherein the parameter signal comprises an indication of an offset frequency or an indication of a power density parameter;

generating a bandwidth extension high-frequency signal comprising a high-frequency band using the input audio signal and the parameter signal comprising the indication of the offset frequency or the indication of the power density parameter;

separating the parameter signal from the received bit stream; and combining the bandwidth extension high-frequency signal and the input audio signal to acquire a bandwidth extended audio signal, wherein an output of the core decoding is transmitted to the generating and the combining, wherein an output of the separating is transmitted to the patch generating and to an output interface, wherein an output of the patch generating is transmitted to the combining, and wherein an output of the combining is transmitted to the output interface.

18. A non-transitory storage medium having stored thereon a computer program with a program code for performing, when the computer program runs on a computer or a microcontroller, a method for performing a bandwidth extension audio decoding, the method comprising:

core decoding a received bit stream comprising an input audio signal and a parameter signal, wherein the parameter signal comprises an indication of an offset frequency or an indication of a power density parameter;

generating a bandwidth extension high-frequency signal comprising a high-frequency band using the input audio signal and the parameter signal including the indication of the offset frequency or the indication of the power density parameter;

separating the parameter signal from the received bit stream; and combining the bandwidth extension high-frequency signal and the input audio signal to acquire a bandwidth extended audio signal, wherein an output of the core decoding is transmitted to the generating and the combining, wherein an output of the separating is transmitted to the patch generating and to an output interface, wherein an output of the patch generating is transmitted to the combining, and wherein an output of the combining is transmitted to the output interface.

* * * * *